United States Patent
Khoshnevisan et al.

(10) Patent No.: US 12,238,040 B2
(45) Date of Patent: Feb. 25, 2025

(54) DATA RATE DECODING FOR TRANSPORT BLOCKS

(71) Applicant: QUALCOMM Incorporated, San Diego, CA (US)

(72) Inventors: Mostafa Khoshnevisan, San Diego, CA (US); Xiaoxia Zhang, San Diego, CA (US); Jing Sun, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 372 days.

(21) Appl. No.: 17/737,382

(22) Filed: May 5, 2022

(65) Prior Publication Data

US 2023/0032862 A1 Feb. 2, 2023

Related U.S. Application Data

(60) Provisional application No. 63/226,615, filed on Jul. 28, 2021.

(51) Int. Cl.
*H04L 5/00* (2006.01)
*H04W 72/12* (2023.01)
(Continued)

(52) U.S. Cl.
CPC ............ *H04L 5/0064* (2013.01); *H04L 5/001* (2013.01); *H04W 72/1273* (2013.01); *H04W 72/23* (2023.01)

(58) Field of Classification Search
CPC ..... H04L 5/0064; H04L 5/001; H04L 5/0044; H04L 5/0091; H04L 1/1896; H04L 1/08;
(Continued)

(56) References Cited

U.S. PATENT DOCUMENTS

2015/0327275 A1* 11/2015 Kwon ................... H04L 5/001
370/236
2017/0295517 A1* 10/2017 Nguyen ............... H04L 5/0055
(Continued)

FOREIGN PATENT DOCUMENTS

WO WO-2020166993 A1 8/2020

OTHER PUBLICATIONS

3GPP: "3rd Generation Partnership Project; Technical Specification Group Radio Access Network; NR; Physical Layer Procedures for Data (Release 16)", 3GPP Standard, Technical Specification, 3GPP TS 38.214, 3rd Generation Partnership Project (3GPP), Mobile Competence Centre, 650, Route Des Lucioles, F-06921 Sophia-Antipolis Cedex, France, vol. RAN WG1, No. 3GPP TS 38.214, V16.6.0, (Jun. 2021), Jun. 2021, 171 Pages, XP052029956.
(Continued)

*Primary Examiner* — Candal Elpenord
(74) *Attorney, Agent, or Firm* — Holland & Hart LLP

(57) ABSTRACT

In a wireless communications system, a user equipment (UE) may receive, from a network device, a downlink control message that schedules a first and second repetition of a transport block for a downlink shared channel in a first component carrier of multiple component carriers, the first and second repetitions scheduled in a first and second transmission occasion associated with the downlink shared channel. The UE may monitor for the repetitions in the respective transmission occasions, and the UE may decode the transport block based on a number of transmission occasions associated with the downlink shared channel in the component carrier and a data rate limit across the multiple component carriers including the first component carrier.

28 Claims, 17 Drawing Sheets

(51) Int. Cl.
  *H04W 72/1273* (2023.01)
  *H04W 72/23* (2023.01)
(58) Field of Classification Search
  CPC .. H04W 72/1273; H04W 72/23; H04W 72/51
  USPC .................................................. 370/329–330
  See application file for complete search history.

(56) References Cited

U.S. PATENT DOCUMENTS

| | | | |
|---|---|---|---|
| 2020/0204312 A1* | 6/2020 | Xu | H04L 5/0035 |
| 2022/0070898 A1 | 3/2022 | Yeo et al. | |
| 2023/0050541 A1* | 2/2023 | Yi | H04L 1/1822 |
| 2024/0155607 A1* | 5/2024 | Han | H04L 1/1893 |

OTHER PUBLICATIONS

International Search Report and Written Opinion—PCT/US2022/033828—ISA/EPO—Oct. 10, 2022 (2106583WO).

Moderator (Qualcomm): "CR on sum Data Rate for tdmSchemeA and fdmSchemeB", 3GPP TSG-RAN Meeting #93, RP-211844, 3rd Generation Partnership Project (3GPP), Mobile Competence Centre, 650, Route Des Lucioles, F-06921 Sophia-Antipolis Cedex, France, vol. RAN WG1, No. e-Meeting, Aug. 16, 2021-Aug. 27, 2021, Sep. 4, 2021, XP052048121, 8 Pages, Section 5.1.3, p. 3-p. 4.

Qualcomm Incorporated: "Maintenance for DL/UL Data Scheduling and HARQ Procedure", 3GPP TSG RAN WG1 Meeting #94bis, 3GPP Draft; R1-1811236 Sched-HARQ-Maintenance, 3rd Generation Partnership Project (3GPP), Mobile Competence Centre, 650, Route Des Lucioles ; F-06921 Sophia-Antipolis Cedex, France, vol. RAN WG1, No. Chengdu, CN; Oct. 8, 2018-Oct. 12, 2018, Sep. 29, 2018 (Sep. 29, 2018), 16 Pages, XP051518637, Paragraph [0004].

Qualcomm: "Summary #3 of Email Discussion Regarding the Out-of-Order HARQ Issue", 3GPP TSG RAN WG1 Meeting #96b, R1-1907925, 3rd Generation Partnership Project (3GPP), Mobile Competence Centre, 650, Route Des Lucioles, F-06921 Sop, vol. RAN WG1, No. Xian, China, Apr. 8, 2019-Apr. 12, 2019, May 20, 2019, pp. 1-23, XP051740183, 44 Pages, Contribution "Qualcomm", last two paragraphs, p. 5-p. 6.

* cited by examiner

DATA RATE DECODING FOR TRANSPORT BLOCKS

CROSS REFERENCE

The present Application for Patent claims the benefit of U.S. Provisional Patent Application No. 63/226,615 by KHOSHNEVISAN et al., entitled "DATA RATE DECODING FOR TRANSPORT BLOCKS," filed Jul. 28, 2021, assigned to the assignee hereof, and expressly incorporated by reference herein.

FIELD OF TECHNOLOGY

The following relates to wireless communications, including data rate decoding for transport blocks.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

In some wireless communications systems, a UE may receive multiple repetitions of a transport block in a transmission interval. Techniques for processing the transport block may be deficient.

SUMMARY

The described techniques relate to improved methods, systems, devices, and apparatuses that support data rate decoding for transport blocks. Generally, the described techniques provide for a user equipment (UE) to use improved data rate physical downlink shared channel (PDSCH) decoding of one or more transport blocks. In some cases, a base station may schedule two or more repetitions of a transport block for a PDSCH in a first component carrier (CC), where a first repetition may be scheduled in a first transmission occasion and a second repetition may be scheduled in a second transmission occasion. The base station may schedule the first and second repetitions based on a time division multiplexing (TDM) resource allocation scheme or a frequency division multiplexing (FDM) resource allocation scheme. The UE may monitor for each repetition of the transport block in respective transmission occasions, and the UE may decode the transport block based on a number of transmission occasions associated with the PDSCH in the first CC and a data rate limit across the multiple CCs including the first CC.

In some examples, the UE may have a data rate capability for the multiple CCs including the first CC, where the data rate limit may be determined based on the data rate capability of the UE, and where the base station may schedule the two repetitions based on receiving a capability message indicating the data rate capability of the UE. The UE may calculate a data rate across all CCs in one or more PDSCHs for a TDM resource allocation scheme or an FDM resource allocation scheme, where the UE may count each transmission occasion (e.g., each repetition) received separately toward a total number of transport blocks in that CC. In some cases, the UE may calculate a data rate in one PDSCH in one CC for a TDM resource allocation scheme or an FDM resource allocation scheme, where the UE may count each transmission occasion (e.g., each repetition) as one PDSCH.

A method for wireless communications at a UE is described. The method may include receiving, from a base station, a downlink control message that schedules a first repetition and a second repetition of a transport block for a downlink shared channel in a first CC of a set of multiple CCs, where the first repetition is scheduled in a first transmission occasion of a set of multiple transmission occasions associated with the downlink shared channel and the second repetition is scheduled in a second transmission occasion of the set of multiple transmission occasions associated with the downlink shared channel, monitoring for the first repetition of the transport block in the first transmission occasion and for the second repetition of the transport block in the second transmission occasion based on the downlink control message, and decoding the transport block based on the monitoring, a number of transmission occasions of the set of multiple transmission occasions associated with the downlink shared channel in the first CC, and a data rate limit across the set of multiple CCs including the first CC.

An apparatus for wireless communications at a UE is described. The apparatus may include a processor, memory coupled with the processor, and instructions stored in the memory. The instructions may be executable by the processor to cause the apparatus to receive, from a base station, a downlink control message that schedules a first repetition and a second repetition of a transport block for a downlink shared channel in a first CC of a set of multiple CCs, where the first repetition is scheduled in a first transmission occasion of a set of multiple transmission occasions associated with the downlink shared channel and the second repetition is scheduled in a second transmission occasion of the set of multiple transmission occasions associated with the downlink shared channel, monitor for the first repetition of the transport block in the first transmission occasion and for the second repetition of the transport block in the second transmission occasion based on the downlink control message, and decode the transport block based on the monitoring, a number of transmission occasions of the set of multiple transmission occasions associated with the downlink shared channel in the first CC, and a data rate limit across the set of multiple CCs including the first CC.

Another apparatus for wireless communications at a UE is described. The apparatus may include means for receiving, from a base station, a downlink control message that schedules a first repetition and a second repetition of a transport block for a downlink shared channel in a first CC of a set of multiple CCs, where the first repetition is scheduled in a first transmission occasion of a set of multiple transmission occasions associated with the downlink shared channel and the second repetition is scheduled in a second transmission occasion of the set of multiple transmission occasions associated with the downlink shared channel, means for monitoring for the first repetition of the transport block in the first transmission occasion and for the second repetition of the transport block in the second transmission occasion based on the downlink control message, and means for decoding the transport block based on the monitoring, a number of transmission occasions of the set of multiple transmission occasions associated with the downlink shared channel in the first CC, and a data rate limit across the set of multiple CCs including the first CC.

A non-transitory computer-readable medium storing code for wireless communications at a UE is described. The code may include instructions executable by a processor to receive, from a base station, a downlink control message that schedules a first repetition and a second repetition of a transport block for a downlink shared channel in a first CC of a set of multiple CCs, where the first repetition is scheduled in a first transmission occasion of a set of multiple transmission occasions associated with the downlink shared channel and the second repetition is scheduled in a second transmission occasion of the set of multiple transmission occasions associated with the downlink shared channel, monitor for the first repetition of the transport block in the first transmission occasion and for the second repetition of the transport block in the second transmission occasion based on the downlink control message, and decode the transport block based on the monitoring, a number of transmission occasions of the set of multiple transmission occasions associated with the downlink shared channel in the first CC, and a data rate limit across the set of multiple CCs including the first CC.

In some examples of the method, apparatuses, and non-transitory computer-readable medium described herein, decoding the transport block may include operations, features, means, or instructions for counting the first transmission occasion and the second transmission occasion separately for a data rate calculation associated with the downlink shared channel in the first CC.

In some examples of the method, apparatuses, and non-transitory computer-readable medium described herein, the data rate limit may be based on a data rate capability of the UE, a number of information bits of the transport block, and the number of transmission occasions of the set of multiple transmission occasions associated with the downlink shared channel in the first CC.

In some examples of the method, apparatuses, and non-transitory computer-readable medium described herein, decoding the transport block may include operations, features, means, or instructions for determining a second data rate limit associated with the downlink shared channel for the first CC based on a first number of symbols for the first transmission occasion.

Some examples of the method, apparatuses, and non-transitory computer-readable medium described herein may further include operations, features, means, or instructions for transmitting, to the network entity, a UE capability message indicating a data rate capability of the UE for the first CC, where the data rate limit may be based on the data rate capability of the UE.

Some examples of the method, apparatuses, and non-transitory computer-readable medium described herein may further include operations, features, means, or instructions for determining a third data rate limit associated with the downlink shared channel for the first CC based on a second number of symbols for the second transmission occasion.

Some examples of the method, apparatuses, and non-transitory computer-readable medium described herein may further include operations, features, means, or instructions for determining a respective data rate for each of the first and second transmission occasions based on the second data rate limit for the first CC, where the first CC may be configured with an enhanced downlink shared channel processing time.

Some examples of the method, apparatuses, and non-transitory computer-readable medium described herein may further include operations, features, means, or instructions for determining a respective data rate for each of the first and second transmission occasions based on the second data rate limit for the first CC, where the downlink shared channel may be a retransmission of a second downlink shared channel.

In some examples of the method, apparatuses, and non-transitory computer-readable medium described herein, determining the respective data rate may include operations, features, means, or instructions for determining the respective data rate for each of the first and second transmission occasions based on a modulation and coding scheme.

Some examples of the method, apparatuses, and non-transitory computer-readable medium described herein may further include operations, features, means, or instructions for determining a transport block size (TB S) based on the second downlink shared channel.

In some examples of the method, apparatuses, and non-transitory computer-readable medium described herein, the second data rate limit for the first CC may be half of a data rate capability of the UE for the first CC, where the first transmission occasion and the second transmission occasion may be non-overlapping in frequency.

In some examples of the method, apparatuses, and non-transitory computer-readable medium described herein, receiving the downlink control message may include operations, features, means, or instructions for receiving the downlink control message indicating the first transmission occasion and the second transmission occasion for the transport block, where the first transmission occasion and the second transmission occasion may be non-overlapping in time.

In some examples of the method, apparatuses, and non-transitory computer-readable medium described herein, receiving the downlink control message may include operations, features, means, or instructions for receiving the downlink control message indicating the first transmission occasion and the second transmission occasion for the transport block, where the first transmission occasion and the second transmission occasion may be non-overlapping in frequency.

Some examples of the method, apparatuses, and non-transitory computer-readable medium described herein may further include operations, features, means, or instructions for receiving, from the base station, a message indicating a transmission configuration indicator (TCI) state for transmission of the first repetition and the second repetition of the transport block for the downlink shared channel.

Some examples of the method, apparatuses, and non-transitory computer-readable medium described herein may further include operations, features, means, or instructions for receiving, from the base station, a message indicating a configuration for the first CC used for transmission of the first repetition and the second repetition of the transport block for the downlink shared channel.

Some examples of the method, apparatuses, and non-transitory computer-readable medium described herein may further include operations, features, means, or instructions for transmitting, to the network entity, a UE capability message indicating a data rate capability of the UE for the set of multiple CCs including the first CC, where the data rate limit may be based on the data rate capability of the UE.

A method for wireless communications at a base station is described. The method may include receiving, from a UE, a UE capability message indicating a data rate capability of the UE for a set of multiple CCs including a first CC and transmitting, to the UE, a downlink control message that schedules a first repetition and a second repetition of a transport block for a downlink shared channel in the first CC of the set of multiple CCs based on the data rate capability of the UE, where the first repetition is scheduled in a first transmission occasion of a set of multiple transmission occasions associated with the downlink shared channel and the second repetition is scheduled in a second transmission occasion of the set of multiple transmission occasions associated with the downlink shared channel.

An apparatus for wireless communications at a base station is described. The apparatus may include a processor, memory coupled with the processor, and instructions stored in the memory. The instructions may be executable by the processor to cause the apparatus to receive, from a UE, a UE capability message indicating a data rate capability of the UE for a set of multiple CCs including a first CC and transmit, to the UE, a downlink control message that schedules a first repetition and a second repetition of a transport block for a downlink shared channel in the first CC of the set of multiple CCs based on the data rate capability of the UE, where the first repetition is scheduled in a first transmission occasion of a set of multiple transmission occasions associated with the downlink shared channel and the second repetition is scheduled in a second transmission occasion of the set of multiple transmission occasions associated with the downlink shared channel.

Another apparatus for wireless communications at a base station is described. The apparatus may include means for receiving, from a UE, a UE capability message indicating a data rate capability of the UE for a set of multiple CCs including a first CC and means for transmitting, to the UE, a downlink control message that schedules a first repetition and a second repetition of a transport block for a downlink shared channel in the first C of the set of multiple CCs based on the data rate capability of the UE, where the first repetition is scheduled in a first transmission occasion of a set of multiple transmission occasions associated with the downlink shared channel and the second repetition is scheduled in a second transmission occasion of the set of multiple transmission occasions associated with the downlink shared channel.

A non-transitory computer-readable medium storing code for wireless communications at a base station is described. The code may include instructions executable by a processor to receive, from a UE, a UE capability message indicating a data rate capability of the UE for a set of multiple CCs including a first CC and transmit, to the UE, a downlink control message that schedules a first repetition and a second repetition of a transport block for a downlink shared channel in the first CC of the set of multiple CCs based on the data rate capability of the UE, where the first repetition is scheduled in a first transmission occasion of a set of multiple transmission occasions associated with the downlink shared channel and the second repetition is scheduled in a second transmission occasion of the set of multiple transmission occasions associated with the downlink shared channel.

Some examples of the method, apparatuses, and non-transitory computer-readable medium described herein may further include operations, features, means, or instructions for transmitting, to the UE, a message indicating a TCI state for transmission of the first repetition and the second repetition of the transport block for the downlink shared channel.

In some examples of the method, apparatuses, and non-transitory computer-readable medium described herein, transmitting the downlink control message may include operations, features, means, or instructions for transmitting the downlink control message indicating the first transmission occasion and the second transmission occasion for the transport block, where the first transmission occasion and the second transmission occasion may be non-overlapping in time.

In some examples of the method, apparatuses, and non-transitory computer-readable medium described herein, transmitting the downlink control message may include operations, features, means, or instructions for transmitting the downlink control message indicating the first transmission occasion and the second transmission occasion for the transport block, where the first transmission occasion and the second transmission occasion may be non-overlapping in frequency.

Some examples of the method, apparatuses, and non-transitory computer-readable medium described herein may further include operations, features, means, or instructions for transmitting, to the UE, a message indicating a configuration for the first CC used for transmission of the first repetition and the second repetition of the transport block for the downlink shared channel.

Some examples of the method, apparatuses, and non-transitory computer-readable medium described herein may further include operations, features, means, or instructions for receiving, from the UE, the UE capability message indicating a data rate capability of the UE for the first CC, where a data rate limit may be based on the data rate capability of the UE.

DETAILED DESCRIPTION

Figure 1:
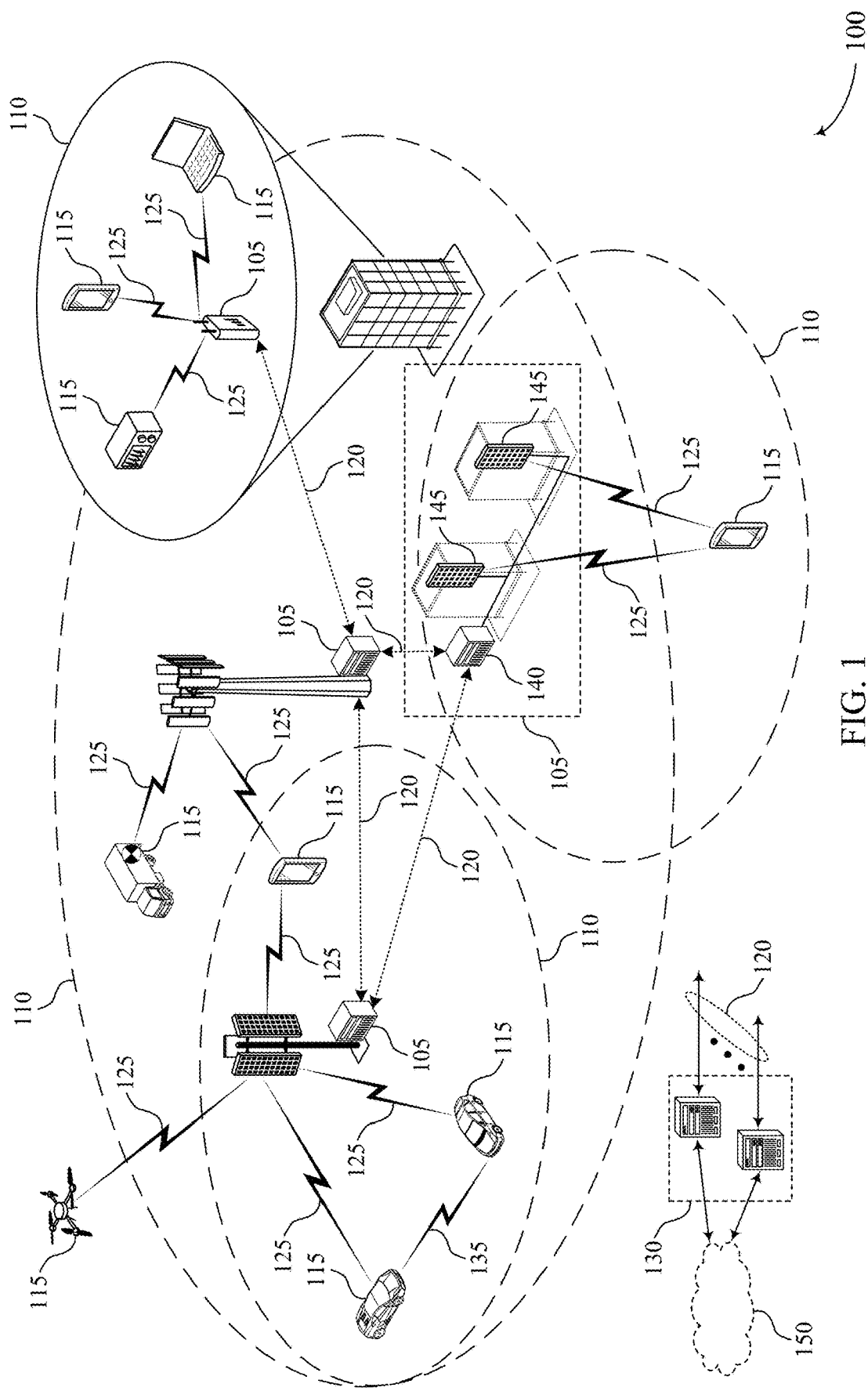
FIG. 1 illustrates an example of a wireless communications system that supports data rate decoding for transport blocks in accordance with aspects of the present disclosure.

In some wireless communications systems, a user equipment (UE) may receive two or more repetitions of a transport block within a transmission interval (e.g., within a slot) (e.g., in the case of a physical downlink shared channel (PDSCH) transmission scheme). The transport block may include a total number of information bits, and each repetition may include a set of bits representative of the total number of information bits. As such, the UE may process more bits as the UE decodes each additional repetition of the transport block. In some cases, the UE may perform separate rate matching where the UE may perform rate matching across each repetition separately to decode the transport block. Although the repetitions corresponds to the same transport block, the UE may lack the ability to sum a data rate for PDSCHs across multiple component carriers (CCs) or in one CC of the PDSCH, and as such, the UE may fail to process or decode all of the information bits in each repetition of the transport block.

Techniques described herein enable a UE to use improved data rate decoding for PDSCH transport blocks. In some cases, a base station may schedule two or more repetitions of a transport block for a PDSCH in a first CC of multiple CCs, where a first repetition may be scheduled in a first transmission occasion and a second repetition may be scheduled in a second transmission occasion. The base station may schedule the first and second repetitions based on a time division multiplexing (TDM) resource allocation scheme or a frequency division multiplexing (FDM) resource allocation scheme. The UE may monitor for each repetition of the transport block in the respective transmission occasion, and the UE may decode the transport block based on a number of transmission occasions associated with the PDSCH in the first CC and a data rate limit across the multiple CCs including the first CC.

In some examples, the UE may have a data rate capability for the multiple CCs including the first CC, where the data rate limit may be determined based on the data rate capability of the UE, and where the base station may schedule the two repetitions based on receiving a capability message indicating the data rate capability of the UE. The UE may calculate a data rate across all CCs in one or more PDSCHs for a TDM resource allocation scheme or an FDM resource allocation scheme, where the UE may count each transmission occasion (e.g., each repetition) received in the PDSCH separately toward a total number of transport blocks in that CC. In some cases, the UE may calculate a data rate in one PDSCH in one CC for a TDM resource allocation scheme or an FDM resource allocation scheme, where the UE may count each transmission occasion (e.g., each repetition) as one PDSCH.

Particular aspects of the subject matter described herein may be implemented to realize one or more advantages. The described techniques may support improvements in data rate decoding for transport blocks. For example, in some cases, the described techniques may enable the UE to decode a transport block based on a number of transmission occasions associated with repetitions of the transport block and a data rate limit, which may reduce power consumption and improve user experience. As such, supported techniques may include improved network operations, and, in some examples, may promote network efficiencies, among other benefits.

Aspects of the disclosure are initially described in the context of wireless communications systems. Aspects of the disclosure are then described in the context of resource allocation schemes and a process flow. Aspects of the disclosure are further illustrated by and described with reference to apparatus diagrams, system diagrams, and flowcharts that relate to data rate decoding for transport blocks.

FIG. 1 illustrates an example of a wireless communications system 100 that supports data rate decoding for transport blocks in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink CCs and one or more uplink CCs according to a carrier aggregation configuration. Carrier aggregation may be used with both frequency division duplexing (FDD) and time division duplexing (TDD) CCs.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g., of the same or a different radio access technology).

The communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a particular radio access technology (e.g., 1.4, 3, 5, 10, 15, 20, 40, or 80 megahertz (MHz)). Devices of the wireless communications system 100 (e.g., the base stations 105, the UEs 115, or both) may have hardware configurations that support communications over a particular carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal FDM (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

One or more numerologies for a carrier may be supported, where a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the base stations 105 or the UEs 115 may be expressed in multiples of a basic time unit which may, for example, refer to a sampling period of $T_S=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally, or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of TDM techniques, FDM techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

Each base station 105 may provide communication coverage via one or more cells, for example a macro cell, a small cell, a hot spot, or other types of cells, or any combination thereof. The term "cell" may refer to a logical communication entity used for communication with a base station 105 (e.g., over a carrier) and may be associated with an identifier for distinguishing neighboring cells (e.g., a physical cell identifier (PCID), a virtual cell identifier (VCID), or others). In some examples, a cell may refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of the base station 105. For example, a cell may be or include a building, a subset of a building, or exterior spaces between or overlapping with geographic coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered base station 105, as compared with a macro cell, and a small cell may operate in the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A base station 105 may support one or multiple cells and may also support communications over the one or more cells using one or multiple CCs.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a move that supports one-way communication via transmission or reception, but not transmission and reception simultaneously). In some examples, half-duplex communications may be performed at a reduced peak rate. Other power conservation techniques for the UEs 115 include entering a power saving deep sleep mode when not engaging in active communications, operating over a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may also operate in a super high frequency (SHF) region using frequency bands from 3 GHz to 30 GHz, also known as the centimeter band, or in an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the base stations 105, and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with CCs operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally, or alternatively, an antenna panel may support radio frequency beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

In some cases, a UE 115 may use improved data rate decoding for PDSCH transport blocks. For example, a base station 105 may schedule two or more repetitions of a transport block for a PDSCH in a first CC of multiple CCs, where a first repetition may be scheduled in a first transmission occasion and a second repetition may be scheduled in a second transmission occasion. The base station 105 may schedule the first and second repetitions based on a TDM resource allocation scheme or an FDM resource allocation scheme. The UE 115 may monitor for each repetition of the transport block in the respective transmission occasion, and the UE 115 may decode the transport block based on a number of transmission occasions associated with the PDSCH in the first CC and a data rate limit across the multiple CCs including the first CC.

In some examples, the UE 115 may have a data rate capability for the multiple CCs including the first CC, where the data rate limit may be determined based on the data rate capability of the UE 115, and where the base station 105 may schedule the two repetitions based on receiving a capability message indicating the data rate capability of the UE 115. The UE 115 may calculate a data rate across all CCs in one or more PDSCHs for a TDM resource allocation scheme or an FDM resource allocation scheme, where the UE 115 may count each transmission occasion (e.g., each repetition) received in the PDSCH separately toward a total number of transport blocks in that CC. In some cases, the UE 115 may calculate a data rate in one PDSCH in one CC for a TDM resource allocation scheme or an FDM resource allocation scheme, where the UE 115 may count each transmission occasion (e.g., each repetition) as one PDSCH.

Figure 2:
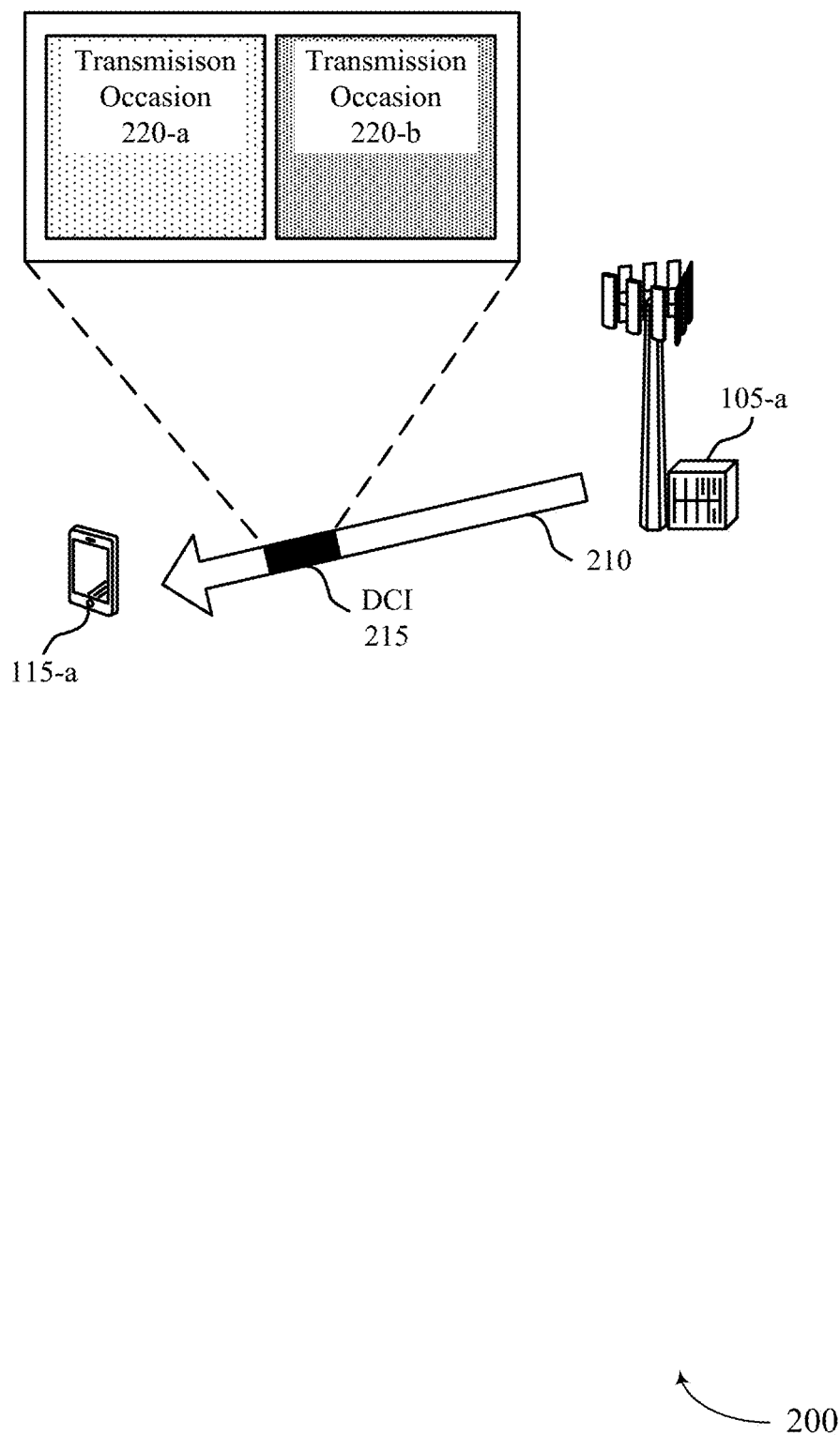
FIG. 2 illustrates an example of a wireless communications scheme that supports data rate decoding for transport blocks in accordance with aspects of the present disclosure.

FIG. 2 illustrates an example of a wireless communications system 200 that supports data rate decoding for transport blocks in accordance with aspects of the present disclosure. In some examples, the wireless communications system 200 may implement aspects of the wireless communications system 100 or may be implemented by aspects of the wireless communications system 100. For example, the wireless communications system 200 may include a UE 115-a and a base station 105-a, which may be examples of corresponding devices described herein. The wireless communications system 200 may include features for improved communications between the UE 115-a and the base station 105-a, among other benefits.

In some cases, a UE 115-a may have some processing capability (e.g., capability 1, capability 2) for processing a PDSCH. The UE 115-a may be associated with a PDSCH processing time, which may be the time duration between the UE 115-a receiving a last symbol of a PDSCH and the UE 115-a transmitting a first symbol of a physical uplink control channel (PUCCH) that may carry HARQ acknowledgment (ACK) feedback corresponding to the PDSCH. In some cases, a number of symbols $N_1$ may determine the processing time, where $N_1$ may depend on a capability of the UE 115-a (e.g., processing capability 1, processing capability 2), a subcarrier spacing (e.g., $\mu$), and whether additional demodulation reference signal (DMRS) symbols are configured (e.g., for capability 1). For a UE 115-a that supports a processing capability 2 on a given cell, the processing time (e.g., according to the UE processing capability 2) may be applied if a higher layer parameter (e.g., processingType2Enabled in PDSCH-ServingCellConfig) is configured for the cell and set to an enabled setting. In some cases, the processing capability 2 may be defined for frequency range 1 (FR1).

The UE 115-a may sum a data rate across CCs (e.g., in a slot) based on a processing capability of the UE 115-a. In some examples, the UE 115-a may sum the data rate across all CCs (e.g., in a slot) according to Equation 1:

$$\sum_{j=0}^{J-1} \frac{\sum_{m=1}^{M-1} V_{j,m}}{T_{slot}^{\mu(j)}} \le DataRate \quad (1)$$

In some examples, $T_{slot}^{\mu(j)}$ may represent the duration of a slot $s_j$, and $V_{j,m}$ may represent the number of information bits of the mth transport block in slot $s_j$ in the jth CC (e.g., of the jth serving cell). The UE 115-a may sum over all of the M transport blocks received in the $CC_j$ of the slot $s_j$ across the CCs, which may be less than or equal to the data rate (e.g., DataRate) of the UE 115-a. The data rate may be calculated based on a capability of the UE 115-a. As such, the data rate may depend on what information the UE 115-a may receive, including corresponding configurations and scheduling (e.g., via downlink control information (DCI)) in different CCs. In some cases, the base station 105-a and the UE 115-a may refrain from exceeding the data rate in Equation 1.

In some cases, the UE 115-a may additionally, or alternatively, have a per-CC data rate limitation, which may be a data rate limitation when PDSCH processing capability 2 is configured for a CC (e.g., a base station 105-a may fail to distribute a load across CCs for capability 2). The per-CC data rate limitation may be calculated according to Equation 2:

$$\frac{\sum_{m=1}^{M-1} V_{j,m}}{L \times T_s^{\mu}} \le DataRateCC \quad (2)$$

In some cases, the UE 115-a may calculate the per-CC data rate limitation in addition to the data rate limitation across all CCs to ensure that both limitations are satisfied for capability 2 or for PDSCH retransmissions. Equation 2 may be calculated for a single PDSCH in one CC, where L may represent the number of symbols assigned to the PDSCH, $$T_s^{\mu} = \frac{10^{-8}}{2^{\mu} \cdot N_{symbol}^{slot}},$$

and μ may represent the numerology of the PDSCH. The per-CC data rate (e.g., DataRateCC) may be calculated based on a capability of the UE 115-a for a given CC (e.g., instead of across CCs).

The data rate capability of the UE 115-a may be based on a reported UE capability (e.g., instead of being related to a network configuration for scheduling information). The data rate (e.g., in Mbps) may be calculated according to Equation 3:

$$data\ rate = 10^{-6} \cdot \sum_{j=1}^{J} \left( v_{layers}^{(j)} \cdot Q_m^{(j)} \cdot f^{(j)} \cdot R_{max} \cdot \frac{N_{PRB}^{BW(j),\mu} \cdot 12}{T_s^{\mu}} \cdot (1 - OH^{(j)}) \right) \quad (3)$$

The data rate (e.g., in Mbps) may be calculated based on parameters the UE 115-a may indicate in UE capability signaling. In some cases, $v_{layers}^{(j)}$ may represent a number of supported layers given by a higher layer parameter for a PDSCH or a physical uplink shared channel (PUSCH) (e.g., maxNumberMIMO-LayersPDSCH for downlink, maxNumberMIMO-LayersCB-PUSCH and maxNumberMIMO-LayersNonCB-PUSCH for uplink), $Q_m^{(j)}$ may represent a supported modulation order given by a higher layer parameter (e.g., supportedModulationOrderDL for downlink, supporedModulationOrderUL for uplink), and $f^{(j)}$ may represent a scaling factor given by a higher layer parameter (e.g., scalingFactor), which may take a value of 1, 0.8, 0.75, and 0.4. In some cases, the scaling factor may enable the UE 115-a the flexibility to indicate that the UE 115-a may refrain from operating at a peak data rate across all CCs at any given time, even if the UE 115-a supports a high number of layers and a high modulation order. In some cases, $R_{max}$ may represent a code rate (e.g., a maximum code rate), $N_{PRB}^{BW(j),\mu}$ may represent a number of RBs in a symbol, where μ may represent the numerology (e.g., subcarrier spacing), and $T_s^{\mu}$ may represent an average OFDM symbol duration in a subframe for numerology μ. In some cases, $OH^{(j)}$ may represent an overhead value, and may take a different value depending on the operating frequency range (e.g., FR1, FR2) and the type of communications (e.g., uplink, downlink). As such, the UE 115-a may calculate a data rate with respect to one symbol.

The UE 115-a may receive a transport block from the base station 105-a configured for different PDSCH transmission schemes. For example, the transport block may be transmitted using a TDM resource allocation scheme or an FDM resource allocation scheme, which are described herein with reference to FIGS. 3A and 3B, respectively. In some cases, the UE 115-a may receive two or more repetitions of the same transport block within one slot (e.g., as in the case of PDSCH transmission schemes TDMSchemeA and FDMSchemeB). The UE 115-a may perform separate rate matching in order to decode the transport block, and the UE 115-a may perform the rate matching across each repetition separately. That is, even though the repetitions may correspond to the same transport block, the UE 115-a may count each repetition separately for the purpose of either sum data rate limitation across all CCs or sum data rate limitation in one CC. For example, the sum data rate as calculated in Equation 1 may be based on one transport block (e.g., the Mth transport block) instead of the number of repetitions of the transport block. That is, the UE 115-a may receive two repetitions of the transport block, and without an indication from the UE 115-a that the UE 115-a may count the two repetitions (e.g., the two transmission occasions) separately toward the data rate, the repetitions may be counted once, which may not represent the full complexity at the UE 115-a.

In some examples, for the sum data rate limitation in one CC for an FDM resource allocation scheme, each transmission occasion may satisfy the half of a data rate per CC given that two transmission occasions corresponding to the two repetitions of the transport block may be in the same symbols. That is, the per-CC data rate limitation described with reference to Equation 2 may be divided by two in the case of an FDM resource allocation scheme because each repetition may contribute individually to the complexity associated with the data rate. In some cases, for PUSCH repetitions in one slot (e.g., PUSCH repetition Type B), each repetition may be counted separately toward the sum data rate. In addition, for the per-CC data rate limitation, each repetition (e.g., for PUSCH repetition Type B) may be treated as one PUSCH. However, PDSCH repetitions for the TDM resource allocation scheme and the FDM resource allocation scheme may lack these data rate limitation techniques.

The wireless communications system 200 may implement techniques for improved data rate decoding of transport blocks. For example, the wireless communications system 200 may support decoding transport blocks for PDSCHs across multiple CCs. In some examples, for sum data rate limitation across all CCs (e.g., in one or more PDSCHs), if in a jth CC with reference to Equation (1, a PDSCH with two or more transmission occasions 220 of a same transport block (e.g., two or more repetitions of the transport block) are received by the UE 115-a, each transmission occasion 220 may be counted separately toward the quantity of M transport blocks in the slot in that CC. For example, in a given CC, the UE 115-a may receive M transport blocks in a given slot $s_j$. If the UE 115-a receives two different repetitions of two different transport blocks in the slot $s_j$, then the UE 115-a may count 4 transport blocks toward the total quantity of M transport blocks.

The UE 115-a may use the sum data rate limitation across all CCs for a TDM resource allocation scheme (e.g., TDMSchemeA), where the UE 115-a may receive two non-overlapping transmission occasions in the time domain, and for an FDM resource allocation scheme (e.g., FDMSchemeB), where the UE 115-a may receive two non-overlapping transmission occasions in the frequency domain. For example, the UE 115-a may receive a transmission occasion 220-a and a transmission occasion 220-b that may be non-overlapping in the time domain or in the frequency domain. The TDM resource allocation scheme and the FDM resource allocation scheme are described herein in more detail with reference to FIGS. 3A and 3B, respectively. The UE 115-a may also use the sum data rate limitation across all CCs in which a PDSCH with two or more transmission occasions 220 may be received. For example, a first PDSCH in a first CC may include two repetitions of the transport block and a second PDSCH different from the first PDSCH in a second CC may include two repetitions of the transport block. If each of the CCs follows the TDM resource allocation scheme or the FDM resource allocation scheme, then the UE 115-a may count each transmission occasion 220 separately toward the M transport blocks in each CC. The sum of all of the transmission occasions 220 over all of the CCs may then be less than or equal to the sum data rate across all CCs (e.g., following Equation 1).

In some examples, the wireless communications system 200 may support decoding transport blocks for a PDSCH in one CC. For sum data rate limitation in one PDSCH in one CC, using Equation 2, the UE 115-a may treat each transmission occasion 220 (e.g., each repetition of the transport block) as one PDSCH. The UE 115-a may use the per-CC data rate for the TDM resource allocation scheme (e.g., TDMSchemeA), where the UE 115-a may receive two non-overlapping transmission occasions in the time domain, and the FDM resource allocation scheme (e.g., FDMSchemeB), where the UE 115-a may receive two non-overlapping transmission occasions in the frequency domain. In some cases, for the TDM resource allocation scheme, the number of symbols L as described with reference to Equation 2, may be equal to the duration of one transmission occasion 220 rather than the duration of both transmission occasions 220 together. In some cases, for the FDM resource allocation scheme, the data rate per transmission occasion 220 may be smaller than or equal to half of the per-CC data rate (e.g., DataRateCC/2) because the UE 115-a may receive the two transmission occasions 220 at the same time in the same symbols.

The UE 115-a may use the per-CC data rate when the UE 115-a receives a PDSCH in a CC configured with a PDSCH processing capability of the UE 115-a (e.g., a processing capability 2, a data rate capability), where the processing capability may enable advanced or enhanced processing. Additionally, or alternatively, the UE 115-a may use the per-CC data rate if a scheduled PDSCH is a retransmission with a reserved modulation and coding scheme (MCS) value (e.g., from an MCS table), in which case the UE 115-a may perform a transport block size (TBS) calculation based on a previous transmission.

In some examples, the UE 115-a may communicate with the base station 105-a via a communications link 210, which may be a downlink communications link. The UE 115-a may receive DCI 215 from the base station 105-a, which may schedule the two repetitions of the transport block for a PDSCH in a first CC of multiple CCs. A first repetition may be scheduled in the transmission occasion 220-a and a second repetition may be scheduled in the transmission occasion 220-b. In some cases, UE 115-a may transmit a capability message to the base station 105-a, which may indicate a data rate capability of the UE 115-a for the multiple CCs. The base station 105-a may schedule the transmission occasions 220 based on the capability message. The UE 115-a may monitor for the transmission occasion 220-a and the transmission occasion 220-b (e.g., and the respective repetitions of the transport block), and the UE 115-a may decode the transport block based on a number of transmission occasions 220 associated with the PDSCH in the first CC and a data rate limit across the multiple CCs including the first CC.

In some examples, the UE 115-a may be configured for sum data rate limitation across all CCs, where the UE 115-a may count the transmission occasion 220-a and the transmission occasion 220-b separately for a data rate calculation (e.g., toward the M transport blocks in the slot $s_j$ in the jth CC). As such, if M is the number of transport blocks transmitted in the slot $s_j$, and if there are two transmission occasions 220 of the same transport block in the time domain or in the frequency domain (e.g., according to TDMSchemeA or FDMSchemeB) in the slot $s_j$, then the UE 115-a may count each transmission occasion 220 separately. In some other examples, the UE 115-a may be configured for sum data rate limitation in one PDSCH in one CC (e.g., per-CC data rate), where the UE 115-a may determine a second data rate limit (e.g., DataRateCC) associated with the PDSCH for the first CC based on a quantity of symbols L for the transmission occasion 220-a, and a third data rate limit associated with the PDSCH for the first CC based on a quantity of symbols L for the transmission occasion 220-b. That is, if L is the quantity of symbols assigned to the PDSCH, then for a PDSCH that includes two transmission occasions 220 in the time domain in one slot, L may be the quantity of symbols of one transmission occasion 220.

Figure 3A:
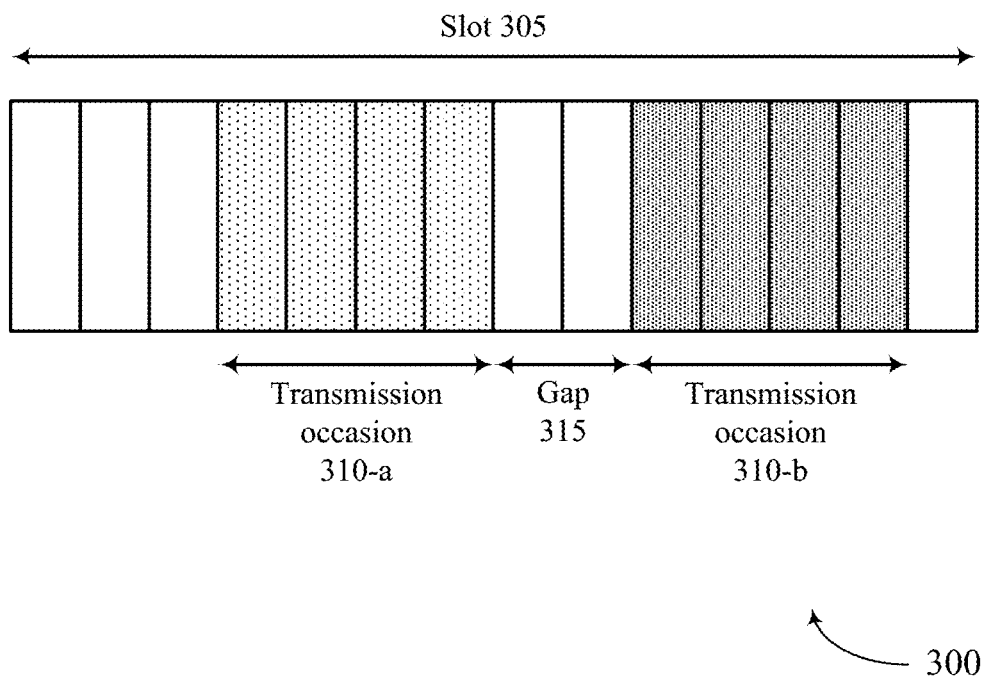
FIGS. 3A and 3B illustrate examples of resource allocation schemes that supports data rate decoding for transport blocks in accordance with aspects of the present disclosure.

FIG. 3A illustrates an example of a resource allocation scheme 300 that supports data rate decoding for transport blocks in accordance with aspects of the present disclosure. In some examples, the resource allocation scheme 300 may implement aspects of the wireless communications systems 100 and 200 or may be implemented by aspects of the wireless communications systems 100 and 200, as described with reference to FIGS. 1 and 2.

In some cases, a UE may communicate with a base station using a multiplexing scheme. For example, the UE may use the resource allocation scheme 300 (e.g., TDMSchemeA), where the UE may receive DCI that may schedule two TDM transmission occasions of the same transport block (e.g., two repetitions of the same transport block) within one transmission interval, such as a slot 305. In some cases, the slot 305 may include 14 symbols. The UE may receive the two repetitions when a transmission configuration indicator (TCI) field within the DCI indicates two TCI states. For example, the UE may receive a transmission occasion 310-*a* and a transmission occasion 310-*b*, where the transmission occasions correspond to a first repetition and a second repetition of the transport block (e.g., for a PDSCH in a CC). The transmission occasion 310-*a* may have a TCI state 1, and the transmission occasion 310-*b* may have a TCI state 2.

In some examples, a time domain resource allocation (TDRA) field in the DCI may be for the transmission occasion 310-*a* (e.g., the first repetition). The TDRA field may indicate the length L (e.g., in number of symbols) and a starting symbol (S) of the transmission occasion 310-*a*. For example, the TDRA field of the DCI may indicate that S=3 and L=4. As such, the transmission occasion 310-*a* may start at the fourth symbol (having slot index 3) in the slot 305 and extend for four total symbols. In some cases, the transmission occasion 310-*b* (e.g., the second repetition) may have the same length as the transmission occasion 310-*a*. As such, the transmission occasion 310-*b* may likewise have a length in symbols of L=4. In some cases, a gap 315 may be configurable between the transmission occasion 310-*a* and the transmission occasion 310-*b*. The gap 315 may be RRC configured and may have a duration of two symbols. In some examples, the first repetition and the second repetition may have different redundancy versions (RVs). For example, the first repetition may have an RV of 0 and the second repetition may have an RV of 2.

Figure 3B:
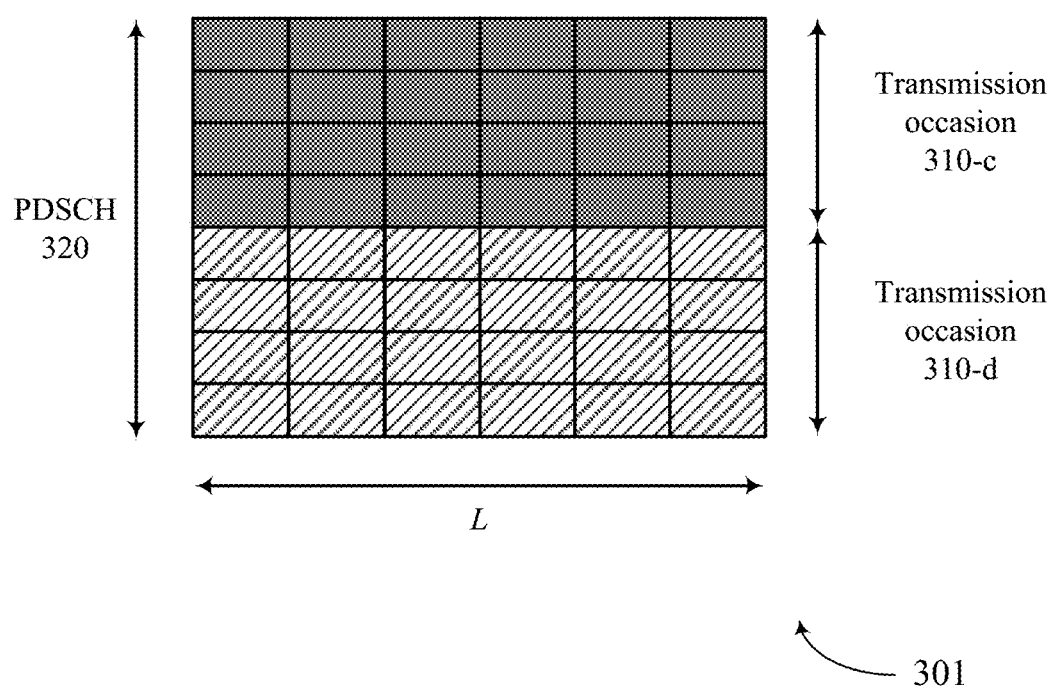

The UE may indicate to a base station whether the UE supports the resource allocation scheme 300 or a different scheme such as an FDM resource allocation scheme, as described herein with reference to FIG. 3B. Based on the indication from the UE, the base station may configure and dynamically schedule the transmission occasion 310-*a* and the transmission occasion 310-*b* using the DCI.

The UE may monitor transmission occasions 310-*a* and 310-*b* to decode a transport block having multiple repetitions. For example, the UE may monitor transmission occasion 310-*a* for a first repetition of the transport block over a given CC and the UE may monitor transmission occasion 310-*b* for a second repetition of the transport block over the same CC or a different CC. To decode the transport block, the UE may count or sum the data rate separately for each repetition or transmission occasion. That is, the UE may consider a sum data rate limitation across all CCs as part of the data rate calculation for decoding the transport block because each repetition individually contributes to the complexity associated with the data rate.

FIG. 3B illustrates an example of a resource allocation scheme 301 that supports data rate decoding for transport blocks in accordance with aspects of the present disclosure. In some examples, the resource allocation scheme 301 may implement aspects of the wireless communications systems 100 and 200 or may be implemented by aspects of the wireless communications systems 100 and 200, as described herein with reference to FIGS. 1 and 2.

In some cases, a UE may communicate signaling with a base station using a multiplexing scheme. For example, the UE may use the resource allocation scheme 301 (e.g., FDMSchemeB), where the UE may receive a DCI scheduling two FDMed (e.g., non-overlapping frequency domain resource allocation (FDRA)) transmission occasions 310 of the same transport block (e.g., two repetitions of the same transport block). The UE may receive the two repetitions when a TCI field within the DCI indicates two TCI states. For example, the UE may receive a PDSCH 320 including a quantity of RBs, where a transmission occasion 310-*c* (e.g., a first repetition of the transport block) may correspond to a first RB set and a transmission occasion 310-*d* (e.g., a second repetition of the transport block) may correspond to a second RB set.

In some cases, the transmission occasion 310-*c* may have a first TCI state, and the transmission occasion 310-*d* may have a second TCI state. The transmission occasion 310-*c* and the transmission occasion 310-*d* may each have a length L=6 symbols, and each RB set may include four RBs. In some cases, an FDRA field may be for overall RBs across the transmission occasion 310-*c* and the transmission occasion 310-*d*. As such, the FDRA field may indicate all of the RBs in the first RB set and the second RB set (e.g., across both repetitions corresponding to both transmission occasions 310), and the first RB set and the second RB set may each correspond to a different TCI state. In some examples, the first repetition and the second repetition may have different RVs. For example, the first repetition may have an RV of 0 and the second repetition may have an RV of 2.

The UE may indicate to a base station whether the UE supports the resource allocation scheme 301 or a different scheme such as a TDM resource allocation scheme, which is described herein with reference to FIG. 3A. Based on the indication from the UE, the base station may configure and dynamically schedule the transmission occasion 310-*c* and the transmission occasion 310-*d* using DCI.

The UE may monitor transmission occasions 310-*c* and 310-*d* to decode a transport block having multiple repetitions. For example, the UE may monitor transmission occasion 310-*c* for a first repetition of the transport block over a given CC and the UE may monitor transmission occasion 310-*d* for a second repetition of the transport block over the same CC or a different CC. To decode the transport block, the UE may count or sum the data rate separately for each repetition or transmission occasion. That is, the UE may consider a sum data rate limitation across all CCs as part of the data rate calculation for decoding the transport block because each repetition individually contributes to the complexity associated with the data rate.

Figure 4:
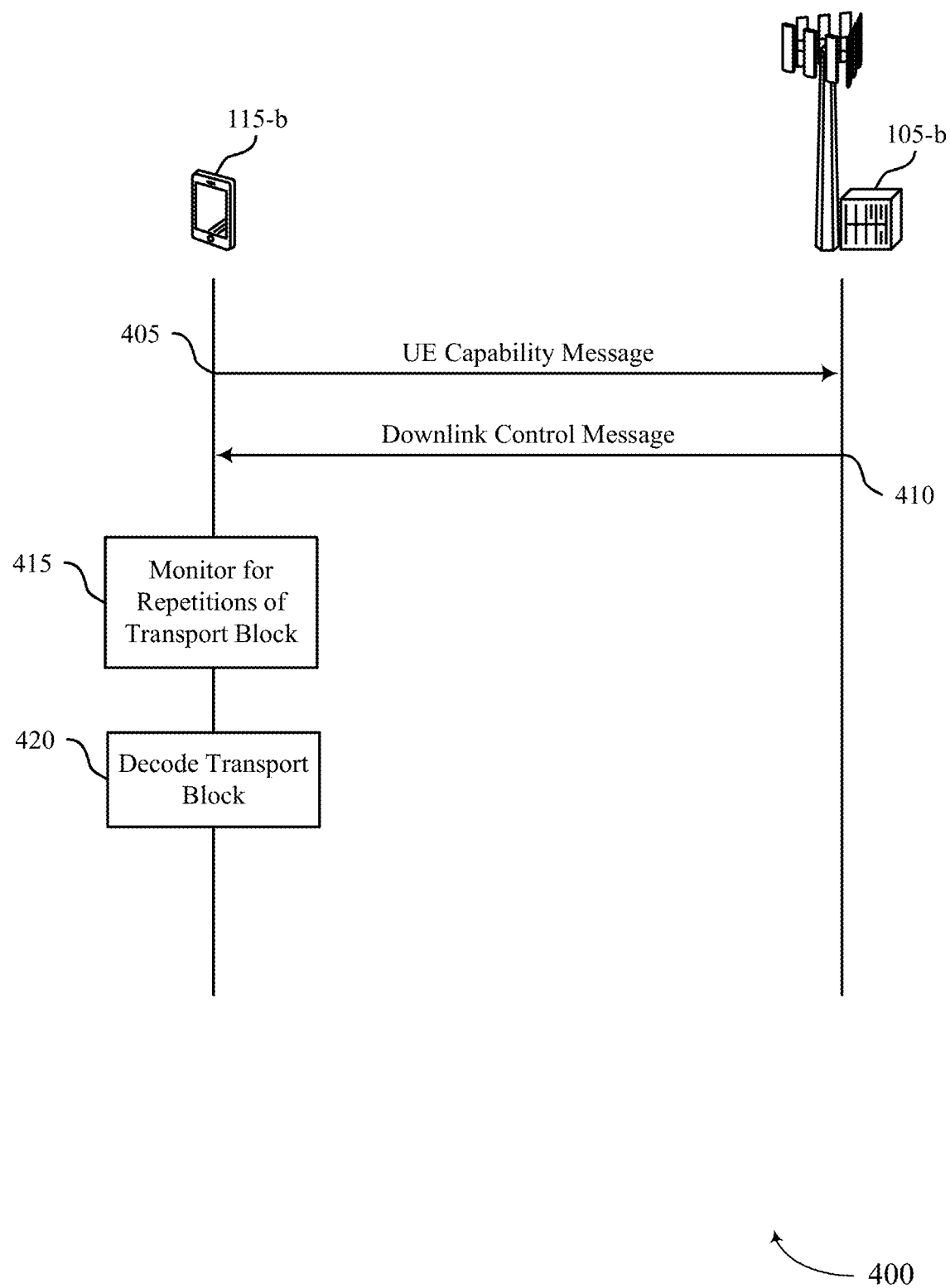
FIG. 4 illustrates an example of a process flow that supports data rate decoding for transport blocks in accordance with aspects of the present disclosure.

FIG. 4 illustrates an example of a process flow 400 that supports data rate decoding for transport blocks in accordance with aspects of the present disclosure. The process flow 400 may implement aspects of wireless communications systems 100 and 200, or may be implemented by aspects of the wireless communications system 100 and 200. For example, the process flow 400 may illustrate operations between a UE 115-*b* and a base station 105-*b*, which may be examples of corresponding devices described herein. In the following description of the process flow 400, the operations between the UE 115-*b* and the base station 105-*b* may be transmitted in a different order than the example order shown, or the operations performed by the UE 115-*b* and the base station 105-*b* may be performed in different orders or at different times. Some operations may also be omitted from the process flow 400, and other operations may be added to the process flow 400.

At 405, the UE 115-*b* may transmit, to the base station 105-*b*, a UE capability message indicating a data rate capability of the UE 115-b for multiple CCs including a first CC. In some cases, the data rate capability may indicate that the UE 115-b may sum a data rate across the multiple CCs or sum the data rate in the first CC.

At 410, the UE 115-b may receive, from the base station 105-b, a downlink control message (e.g., DCI) that schedules a first repetition and a second repetition of a transport block for a PDSCH in a first CC of multiple CCs. In some cases, the first repetition may be scheduled in a first transmission occasion of multiple transmission occasions and the second repetition may be scheduled in a second transmission occasion of the multiple transmission occasions associated with the PDSCH. In some cases, the UE 115-b may receive the downlink control message based on the data rate capability of the UE 115-b.

At 415, the UE 115-b may monitor for the first repetition of the transport block in the first transmission occasion and for the second repetition of the transport block in the second transmission occasion based at least in part on the downlink control message.

At 420, the UE 115-b may decode the transport block based on the monitoring, a number of transmission occasions of the multiple transmission occasions associated with the PDSCH in the first CC, and a data rate limit across the plurality of CCs including the first CC. For example, the UE 115-b may sum a data rate across all CCs in one or more PDSCHs, where the data rate limit may be based on the data rate capability of the UE 115-b. In some cases, the UE 115-b may sum the data rate across the first CC in the PDSCH, where a second data rate limit for the first CC may be half of a data rate capability of the UE for the first CC.

Figure 5:
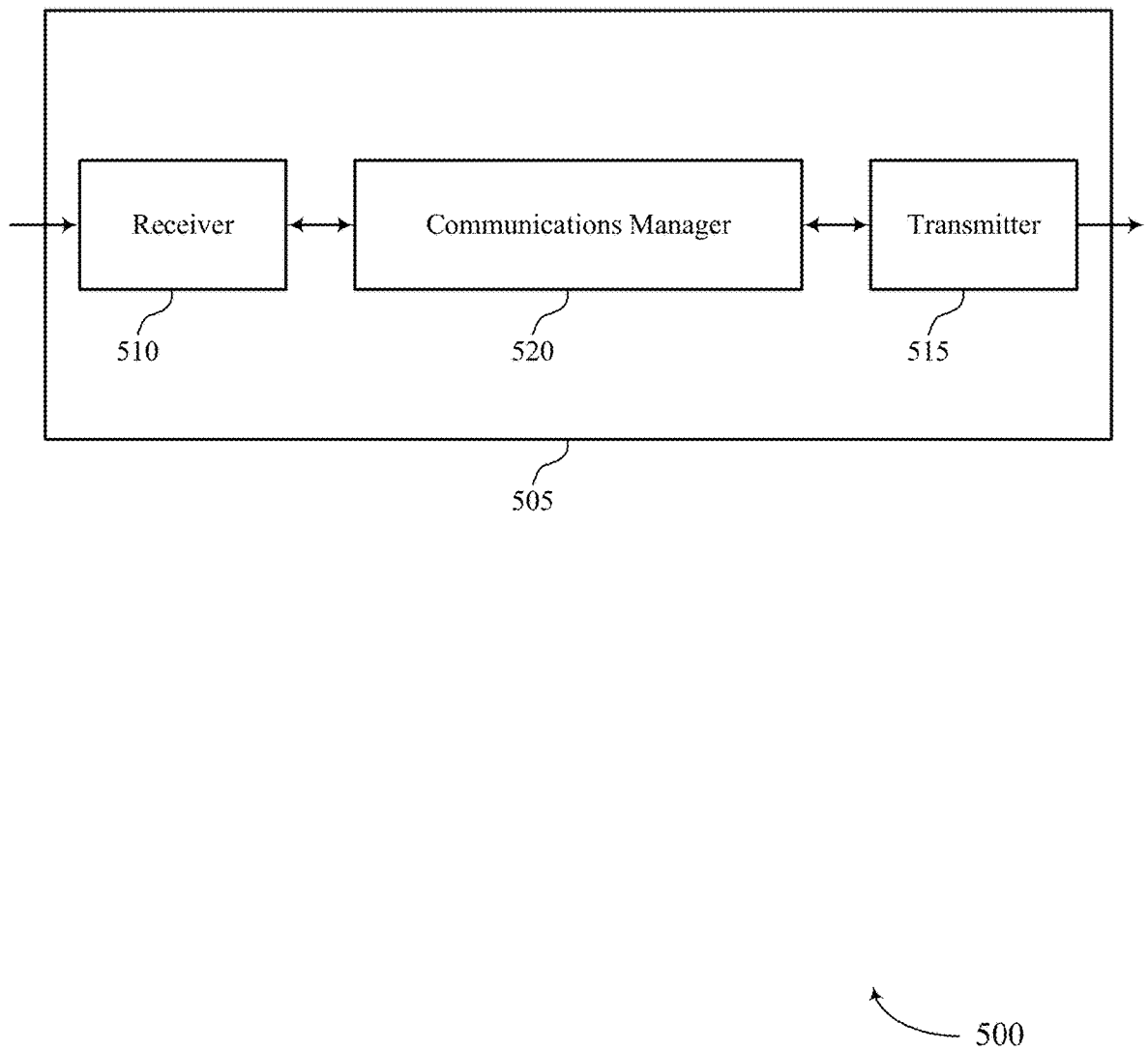
FIGS. 5 and 6 show block diagrams of devices that support data rate decoding for transport blocks in accordance with aspects of the present disclosure.

FIG. 5 shows a block diagram 500 of a device 505 that supports data rate decoding for transport blocks in accordance with aspects of the present disclosure. The device 505 may be an example of aspects of a UE 115 as described herein. The device 505 may include a receiver 510, a transmitter 515, and a communications manager 520. The device 505 may also include a processor. Each of these components may be in communication with one another (e.g., via one or more buses).

The receiver 510 may provide a means for receiving information such as packets, user data, control information, or any combination thereof associated with various information channels (e.g., control channels, data channels, information channels related to data rate decoding for transport blocks). Information may be passed on to other components of the device 505. The receiver 510 may utilize a single antenna or a set of multiple antennas.

The transmitter 515 may provide a means for transmitting signals generated by other components of the device 505. For example, the transmitter 515 may transmit information such as packets, user data, control information, or any combination thereof associated with various information channels (e.g., control channels, data channels, information channels related to data rate decoding for transport blocks). In some examples, the transmitter 515 may be co-located with a receiver 510 in a transceiver module. The transmitter 515 may utilize a single antenna or a set of multiple antennas.

The communications manager 520, the receiver 510, the transmitter 515, or various combinations thereof or various components thereof may be examples of means for performing various aspects of data rate decoding for transport blocks as described herein. For example, the communications manager 520, the receiver 510, the transmitter 515, or various combinations or components thereof may support a method for performing one or more of the functions described herein.

In some examples, the communications manager 520, the receiver 510, the transmitter 515, or various combinations or components thereof may be implemented in hardware (e.g., in communications management circuitry). The hardware may include a processor, a digital signal processor (DSP), an application-specific integrated circuit (ASIC), a field-programmable gate array (FPGA) or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally, or alternatively, in some examples, the communications manager 520, the receiver 510, the transmitter 515, or various combinations or components thereof may be implemented in code (e.g., as communications management software or firmware) executed by a processor. If implemented in code executed by a processor, the functions of the communications manager 520, the receiver 510, the transmitter 515, or various combinations or components thereof may be performed by a general-purpose processor, a DSP, a central processing unit (CPU), an ASIC, an FPGA, or any combination of these or other programmable logic devices (e.g., configured as or otherwise supporting a means for performing the functions described in the present disclosure).

In some examples, the communications manager 520 may be configured to perform various operations (e.g., receiving, monitoring, transmitting) using or otherwise in cooperation with the receiver 510, the transmitter 515, or both. For example, the communications manager 520 may receive information from the receiver 510, send information to the transmitter 515, or be integrated in combination with the receiver 510, the transmitter 515, or both to receive information, transmit information, or perform various other operations as described herein.

The communications manager 520 may support wireless communications at a UE in accordance with examples as disclosed herein. For example, the communications manager 520 may be configured as or otherwise support a means for receiving, from a base station, a downlink control message that schedules a first repetition and a second repetition of a transport block for a downlink shared channel in a first CC of a set of multiple CCs, where the first repetition is scheduled in a first transmission occasion of a set of multiple transmission occasions associated with the downlink shared channel and the second repetition is scheduled in a second transmission occasion of the set of multiple transmission occasions associated with the downlink shared channel. The communications manager 520 may be configured as or otherwise support a means for monitoring for the first repetition of the transport block in the first transmission occasion and for the second repetition of the transport block in the second transmission occasion based on the downlink control message. The communications manager 520 may be configured as or otherwise support a means for decoding the transport block based on the monitoring, a number of transmission occasions of the set of multiple transmission occasions associated with the downlink shared channel in the first CC, and a data rate limit across the set of multiple CCs including the first CC.

By including or configuring the communications manager 520 in accordance with examples as described herein, the device 505 (e.g., a processor controlling or otherwise coupled to the receiver 510, the transmitter 515, the communications manager 520, or a combination thereof) may support techniques for data rate decoding for transport blocks, which may reduce power consumption and improve coordination between devices. Further, the supported techniques may improve network operations and promote network efficiencies.

Figure 6:
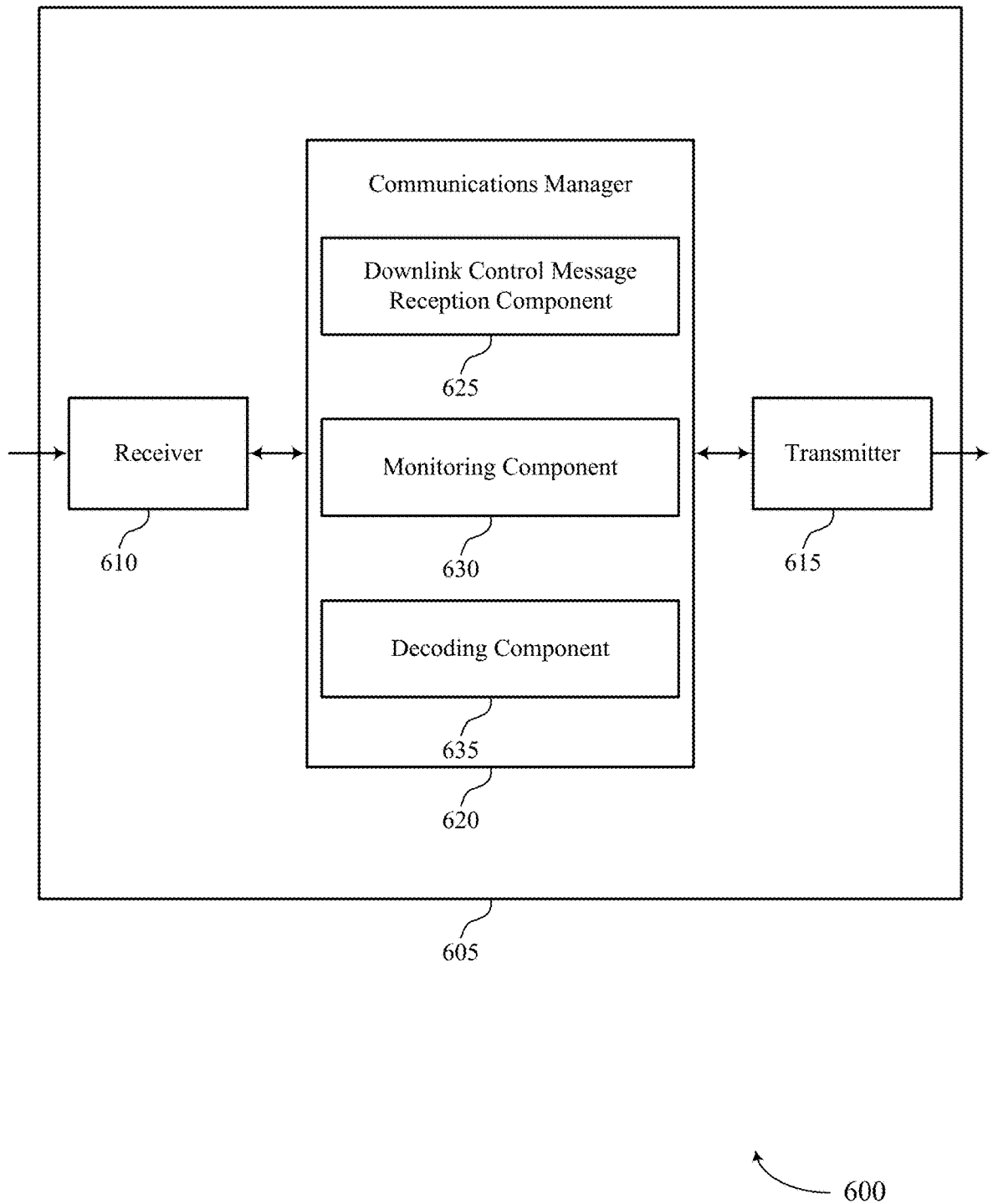

FIG. 6 shows a block diagram 600 of a device 605 that supports data rate decoding for transport blocks in accordance with aspects of the present disclosure. The device 605 may be an example of aspects of a device 505 or a UE 115 as described herein. The device 605 may include a receiver 610, a transmitter 615, and a communications manager 620. The device 605 may also include a processor. Each of these components may be in communication with one another (e.g., via one or more buses).

The receiver 610 may provide a means for receiving information such as packets, user data, control information, or any combination thereof associated with various information channels (e.g., control channels, data channels, information channels related to data rate decoding for transport blocks). Information may be passed on to other components of the device 605. The receiver 610 may utilize a single antenna or a set of multiple antennas.

The transmitter 615 may provide a means for transmitting signals generated by other components of the device 605. For example, the transmitter 615 may transmit information such as packets, user data, control information, or any combination thereof associated with various information channels (e.g., control channels, data channels, information channels related to data rate decoding for transport blocks). In some examples, the transmitter 615 may be co-located with a receiver 610 in a transceiver module. The transmitter 615 may utilize a single antenna or a set of multiple antennas.

The device 605, or various components thereof, may be an example of means for performing various aspects of data rate decoding for transport blocks as described herein. For example, the communications manager 620 may include a downlink control message reception component 625, a monitoring component 630, a decoding component 635, or any combination thereof. The communications manager 620 may be an example of aspects of a communications manager 520 as described herein. In some examples, the communications manager 620, or various components thereof, may be configured to perform various operations (e.g., receiving, monitoring, transmitting) using or otherwise in cooperation with the receiver 610, the transmitter 615, or both. For example, the communications manager 620 may receive information from the receiver 610, send information to the transmitter 615, or be integrated in combination with the receiver 610, the transmitter 615, or both to receive information, transmit information, or perform various other operations as described herein.

The communications manager 620 may support wireless communications at a UE in accordance with examples as disclosed herein. The downlink control message reception component 625 may be configured as or otherwise support a means for receiving, from a base station, a downlink control message that schedules a first repetition and a second repetition of a transport block for a downlink shared channel in a first CC of a set of multiple CCs, where the first repetition is scheduled in a first transmission occasion of a set of multiple transmission occasions associated with the downlink shared channel and the second repetition is scheduled in a second transmission occasion of the set of multiple transmission occasions associated with the downlink shared channel. The monitoring component 630 may be configured as or otherwise support a means for monitoring for the first repetition of the transport block in the first transmission occasion and for the second repetition of the transport block in the second transmission occasion based on the downlink control message. The decoding component 635 may be configured as or otherwise support a means for decoding the transport block based on the monitoring, a number of transmission occasions of the set of multiple transmission occasions associated with the downlink shared channel in the first CC, and a data rate limit across the set of multiple CCs including the first CC.

Figure 7:
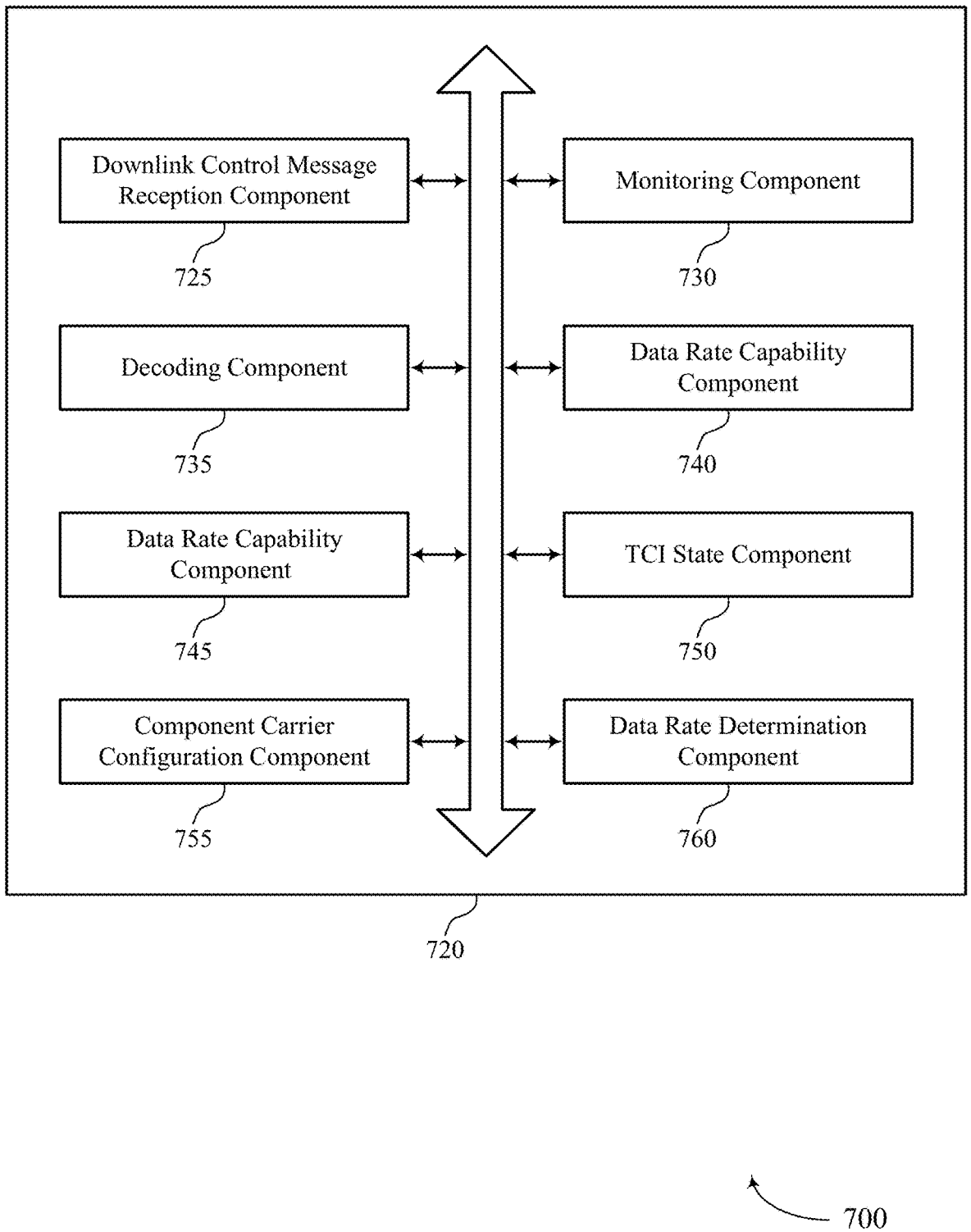
FIG. 7 shows a block diagram of a communications manager that supports data rate decoding for transport blocks in accordance with aspects of the present disclosure.

FIG. 7 shows a block diagram 700 of a communications manager 720 that supports data rate decoding for transport blocks in accordance with aspects of the present disclosure. The communications manager 720 may be an example of aspects of a communications manager 520, a communications manager 620, or both, as described herein. The communications manager 720, or various components thereof, may be an example of means for performing various aspects of data rate decoding for transport blocks as described herein. For example, the communications manager 720 may include a downlink control message reception component 725, a monitoring component 730, a decoding component 735, a data rate capability component 740, a data rate capability component 745, a TCI state component 750, a CC configuration component 755, a data rate determination component 760, or any combination thereof. Each of these components may communicate, directly or indirectly, with one another (e.g., via one or more buses).

The communications manager 720 may support wireless communications at a UE in accordance with examples as disclosed herein. The downlink control message reception component 725 may be configured as or otherwise support a means for receiving, from a base station, a downlink control message that schedules a first repetition and a second repetition of a transport block for a downlink shared channel in a first CC of a set of multiple CCs, where the first repetition is scheduled in a first transmission occasion of a set of multiple transmission occasions associated with the downlink shared channel and the second repetition is scheduled in a second transmission occasion of the set of multiple transmission occasions associated with the downlink shared channel. The monitoring component 730 may be configured as or otherwise support a means for monitoring for the first repetition of the transport block in the first transmission occasion and for the second repetition of the transport block in the second transmission occasion based on the downlink control message. The decoding component 735 may be configured as or otherwise support a means for decoding the transport block based on the monitoring, a number of transmission occasions of the set of multiple transmission occasions associated with the downlink shared channel in the first CC, and a data rate limit across the set of multiple CCs including the first CC.

In some examples, the data rate capability component 740 may be configured as or otherwise support a means for transmitting, to the base station, a UE capability message indicating a data rate capability of the UE for the set of multiple CCs including the first CC, where the data rate limit is based on the data rate capability of the UE.

In some examples, the data rate limit is based on a data rate capability of the UE, a number of information bits of the transport block, and the number of transmission occasions of the set of multiple transmission occasions associated with the downlink shared channel in the first CC.

In some examples, the TCI state component 750 may be configured as or otherwise support a means for receiving, from the base station, a message indicating a TCI state for transmission of the first repetition and the second repetition of the transport block for the downlink shared channel.

In some examples, to support decoding the transport block, the decoding component 735 may be configured as or otherwise support a means for counting the first transmission occasion and the second transmission occasion separately for a data rate calculation associated with the downlink shared channel in the first CC.

In some examples, to support receiving the downlink control message, the downlink control message reception component 725 may be configured as or otherwise support a means for receiving the downlink control message indicating the first transmission occasion and the second transmission occasion for the transport block, where the first transmission occasion and the second transmission occasion are non-overlapping in time.

In some examples, to support receiving the downlink control message, the downlink control message reception component 725 may be configured as or otherwise support a means for receiving the downlink control message indicating the first transmission occasion and the second transmission occasion for the transport block, where the first transmission occasion and the second transmission occasion are non-overlapping in frequency.

In some examples, the CC configuration component 755 may be configured as or otherwise support a means for receiving, from the base station, a message indicating a configuration for the first CC used for transmission of the first repetition and the second repetition of the transport block for the downlink shared channel.

In some examples, to support decoding the transport block, the decoding component 735 may be configured as or otherwise support a means for determining a second data rate limit associated with the downlink shared channel for the first CC based on a first number of symbols for the first transmission occasion.

In some examples, the decoding component 735 may be configured as or otherwise support a means for determining a third data rate limit associated with the downlink shared channel for the first CC based on a second number of symbols for the second transmission occasion.

In some examples, the data rate capability component 740 may be configured as or otherwise support a means for transmitting, to the base station, a UE capability message indicating a data rate capability of the UE for the first CC, where the data rate limit is based on the data rate capability of the UE.

In some examples, the second data rate limit for the first CC is half of a data rate capability of the UE for the first CC, where the first transmission occasion and the second transmission occasion are non-overlapping in frequency.

In some examples, the data rate determination component 760 may be configured as or otherwise support a means for determining a respective data rate for each of the first and second transmission occasions based on the second data rate limit for the first CC, where the first CC is configured with an enhanced downlink shared channel processing time.

In some examples, the data rate determination component 760 may be configured as or otherwise support a means for determining a respective data rate for each of the first and second transmission occasions based at least in part on the second data rate limit for the first CC, where the downlink shared channel is a retransmission of a second downlink shared channel.

In some examples, to support determining the respective data rate, the data rate determination component 760 may be configured as or otherwise support a means for determining the respective data rate for each of the first and second transmission occasions based on a modulation and coding scheme.

In some examples, the data rate determination component 760 may be configured as or otherwise support a means for determining a TBS based on the second downlink shared channel.

Figure 8:
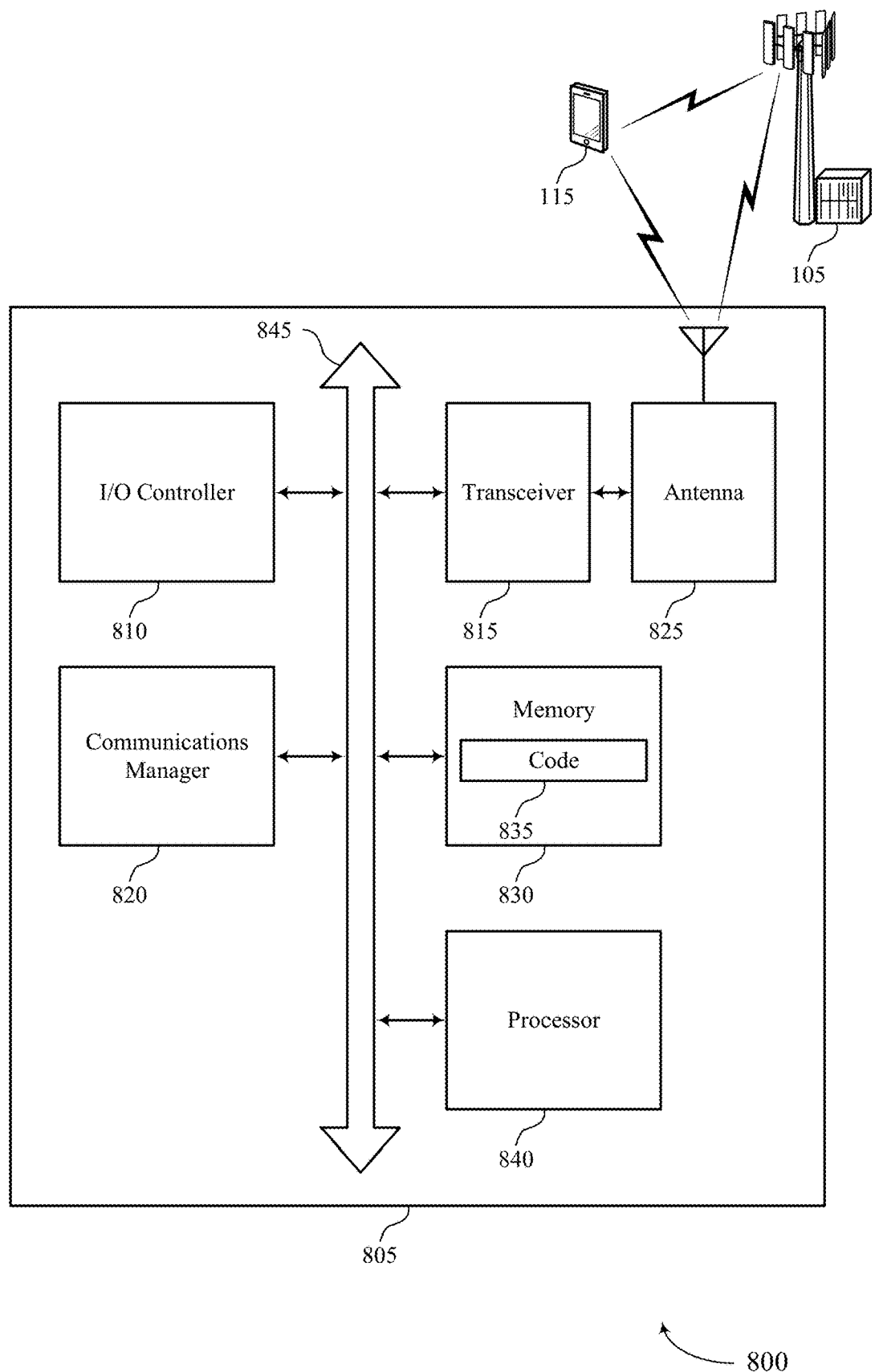
FIG. 8 shows a diagram of a system including a device that supports data rate decoding for transport blocks in accordance with aspects of the present disclosure.

FIG. 8 shows a diagram of a system 800 including a device 805 that supports data rate decoding for transport blocks in accordance with aspects of the present disclosure. The device 805 may be an example of or include the components of a device 505, a device 605, or a UE 115 as described herein. The device 805 may communicate wirelessly with one or more base stations 105, UEs 115, or any combination thereof. The device 805 may include components for bi-directional voice and data communications including components for transmitting and receiving communications, such as a communications manager 820, an input/output (I/O) controller 810, a transceiver 815, an antenna 825, a memory 830, code 835, and a processor 840. These components may be in electronic communication or otherwise coupled (e.g., operatively, communicatively, functionally, electronically, electrically) via one or more buses (e.g., a bus 845).

The I/O controller 810 may manage input and output signals for the device 805. The I/O controller 810 may also manage peripherals not integrated into the device 805. In some cases, the I/O controller 810 may represent a physical connection or port to an external peripheral. In some cases, the I/O controller 810 may utilize an operating system such as iOS®, ANDROID®, MS-DOS®, MS-WINDOWS®, OS/2®, UNIX®, LINUX®, or another known operating system. Additionally, or alternatively, the I/O controller 810 may represent or interact with a modem, a keyboard, a mouse, a touchscreen, or a similar device. In some cases, the I/O controller 810 may be implemented as part of a processor, such as the processor 840. In some cases, a user may interact with the device 805 via the I/O controller 810 or via hardware components controlled by the I/O controller 810.

In some cases, the device 805 may include a single antenna 825. However, in some other cases, the device 805 may have more than one antenna 825, which may be capable of concurrently transmitting or receiving multiple wireless transmissions. The transceiver 815 may communicate bi-directionally, via the one or more antennas 825, wired, or wireless links as described herein. For example, the transceiver 815 may represent a wireless transceiver and may communicate bi-directionally with another wireless transceiver. The transceiver 815 may also include a modem to modulate the packets, to provide the modulated packets to one or more antennas 825 for transmission, and to demodulate packets received from the one or more antennas 825. The transceiver 815, or the transceiver 815 and one or more antennas 825, may be an example of a transmitter 515, a transmitter 615, a receiver 510, a receiver 610, or any combination thereof or component thereof, as described herein.

The memory 830 may include random access memory (RAM) and read-only memory (ROM). The memory 830 may store computer-readable, computer-executable code 835 including instructions that, when executed by the processor 840, cause the device 805 to perform various functions described herein. The code 835 may be stored in a non-transitory computer-readable medium such as system memory or another type of memory. In some cases, the code 835 may not be directly executable by the processor 840 but may cause a computer (e.g., when compiled and executed) to perform functions described herein. In some cases, the memory 830 may contain, among other things, a basic I/O system (BIOS) which may control basic hardware or software operation such as the interaction with peripheral components or devices.

The processor 840 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 840 may be configured to operate a memory array using a memory controller. In some other cases, a memory controller may be integrated into the processor 840. The processor 840 may be configured to execute computer-readable instructions stored in a memory (e.g., the memory 830) to cause the device 805 to perform various functions (e.g., functions or tasks supporting data rate decoding for transport blocks). For example, the device 805 or a component of the device 805 may include a processor 840 and memory 830 coupled to the processor 840, the processor 840 and memory 830 configured to perform various functions described herein.

The communications manager 820 may support wireless communications at a UE in accordance with examples as disclosed herein. For example, the communications manager 820 may be configured as or otherwise support a means for receiving, from a base station, a downlink control message that schedules a first repetition and a second repetition of a transport block for a downlink shared channel in a first CC of a set of multiple CCs, where the first repetition is scheduled in a first transmission occasion of a set of multiple transmission occasions associated with the downlink shared channel and the second repetition is scheduled in a second transmission occasion of the set of multiple transmission occasions associated with the downlink shared channel. The communications manager 820 may be configured as or otherwise support a means for monitoring for the first repetition of the transport block in the first transmission occasion and for the second repetition of the transport block in the second transmission occasion based on the downlink control message. The communications manager 820 may be configured as or otherwise support a means for decoding the transport block based on the monitoring, a number of transmission occasions of the set of multiple transmission occasions associated with the downlink shared channel in the first CC, and a data rate limit across the set of multiple CCs including the first CC.

By including or configuring the communications manager 820 in accordance with examples as described herein, the device 805 may support techniques for data rate decoding for transport blocks, which may increase the likelihood of successful reception of a transport block. Such techniques may reduce retransmission associated with a transport block, which may increase network efficiency and reduce power consumption, which may result in increased battery life. Further, the supported techniques may improve network operations through more effective resource usage.

In some examples, the communications manager 820 may be configured to perform various operations (e.g., receiving, monitoring, transmitting) using or otherwise in cooperation with the transceiver 815, the one or more antennas 825, or any combination thereof. Although the communications manager 820 is illustrated as a separate component, in some examples, one or more functions described with reference to the communications manager 820 may be supported by or performed by the processor 840, the memory 830, the code 835, or any combination thereof. For example, the code 835 may include instructions executable by the processor 840 to cause the device 805 to perform various aspects of data rate decoding for transport blocks as described herein, or the processor 840 and the memory 830 may be otherwise configured to perform or support such operations.

Figure 9:
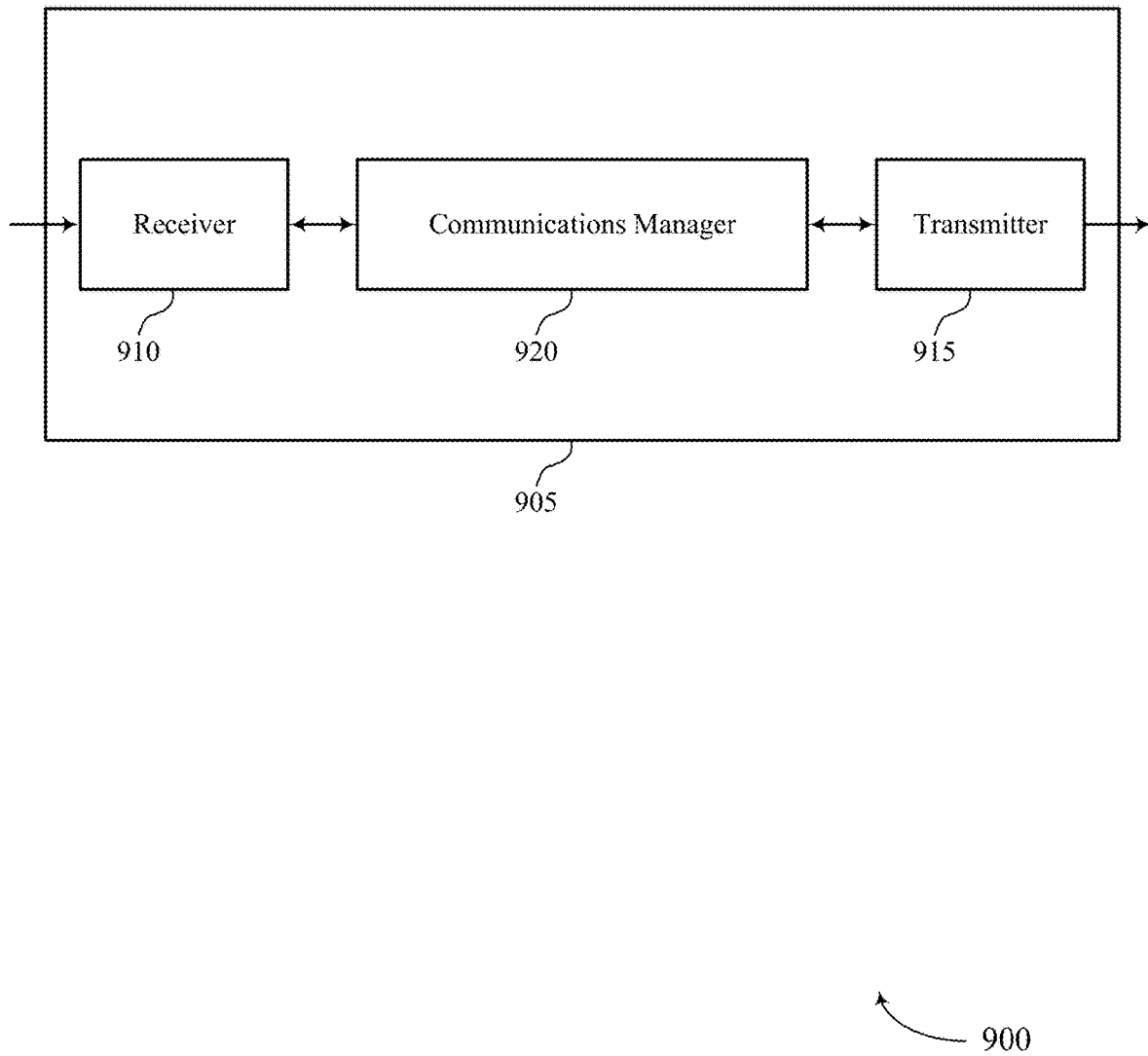
FIGS. 9 and 10 show block diagrams of devices that support data rate decoding for transport blocks in accordance with aspects of the present disclosure.

FIG. 9 shows a block diagram 900 of a device 905 that supports data rate decoding for transport blocks in accordance with aspects of the present disclosure. The device 905 may be an example of aspects of a base station 105 as described herein. The device 905 may include a receiver 910, a transmitter 915, and a communications manager 920. The device 905 may also include a processor. Each of these components may be in communication with one another (e.g., via one or more buses).

The receiver 910 may provide a means for receiving information such as packets, user data, control information, or any combination thereof associated with various information channels (e.g., control channels, data channels, information channels related to data rate decoding for transport blocks). Information may be passed on to other components of the device 905. The receiver 910 may utilize a single antenna or a set of multiple antennas.

The transmitter 915 may provide a means for transmitting signals generated by other components of the device 905. For example, the transmitter 915 may transmit information such as packets, user data, control information, or any combination thereof associated with various information channels (e.g., control channels, data channels, information channels related to data rate decoding for transport blocks). In some examples, the transmitter 915 may be co-located with a receiver 910 in a transceiver module. The transmitter 915 may utilize a single antenna or a set of multiple antennas.

The communications manager 920, the receiver 910, the transmitter 915, or various combinations thereof or various components thereof may be examples of means for performing various aspects of data rate decoding for transport blocks as described herein. For example, the communications manager 920, the receiver 910, the transmitter 915, or various combinations or components thereof may support a method for performing one or more of the functions described herein.

In some examples, the communications manager 920, the receiver 910, the transmitter 915, or various combinations or components thereof may be implemented in hardware (e.g., in communications management circuitry). The hardware may include a processor, a DSP, an ASIC, an FPGA or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally, or alternatively, in some examples, the communications manager 920, the receiver 910, the transmitter 915, or various combinations or components thereof may be implemented in code (e.g., as communications management software or firmware) executed by a processor. If implemented in code executed by a processor, the functions of the communications manager 920, the receiver 910, the transmitter 915, or various combinations or components thereof may be performed by a general-purpose processor, a DSP, a CPU, an ASIC, an FPGA, or any combination of these or other programmable logic devices (e.g., configured as or otherwise supporting a means for performing the functions described in the present disclosure).

In some examples, the communications manager 920 may be configured to perform various operations (e.g., receiving, monitoring, transmitting) using or otherwise in cooperation with the receiver 910, the transmitter 915, or both. For example, the communications manager 920 may receive information from the receiver 910, send information to the transmitter 915, or be integrated in combination with the receiver 910, the transmitter 915, or both to receive information, transmit information, or perform various other operations as described herein.

The communications manager 920 may support wireless communications at a base station in accordance with examples as disclosed herein. For example, the communications manager 920 may be configured as or otherwise support a means for receiving, from a UE, a UE capability message indicating a data rate capability of the UE for a set of multiple CCs including a first CC. The communications manager 920 may be configured as or otherwise support a means for transmitting, to the UE, a downlink control message that schedules a first repetition and a second repetition of a transport block for a downlink shared channel in the first CC of the set of multiple CCs based on the data rate capability of the UE, where the first repetition is scheduled in a first transmission occasion of a set of multiple transmission occasions associated with the downlink shared channel and the second repetition is scheduled in a second transmission occasion of the set of multiple transmission occasions associated with the downlink shared channel.

By including or configuring the communications manager 920 in accordance with examples as described herein, the device 905 (e.g., a processor controlling or otherwise coupled to the receiver 910, the transmitter 915, the communications manager 920, or a combination thereof) may support techniques for data rate decoding for transport blocks, which may reduce power consumption and improve coordination between devices. Further, the supported techniques may improve network operations and promote network efficiencies.

Figure 10:
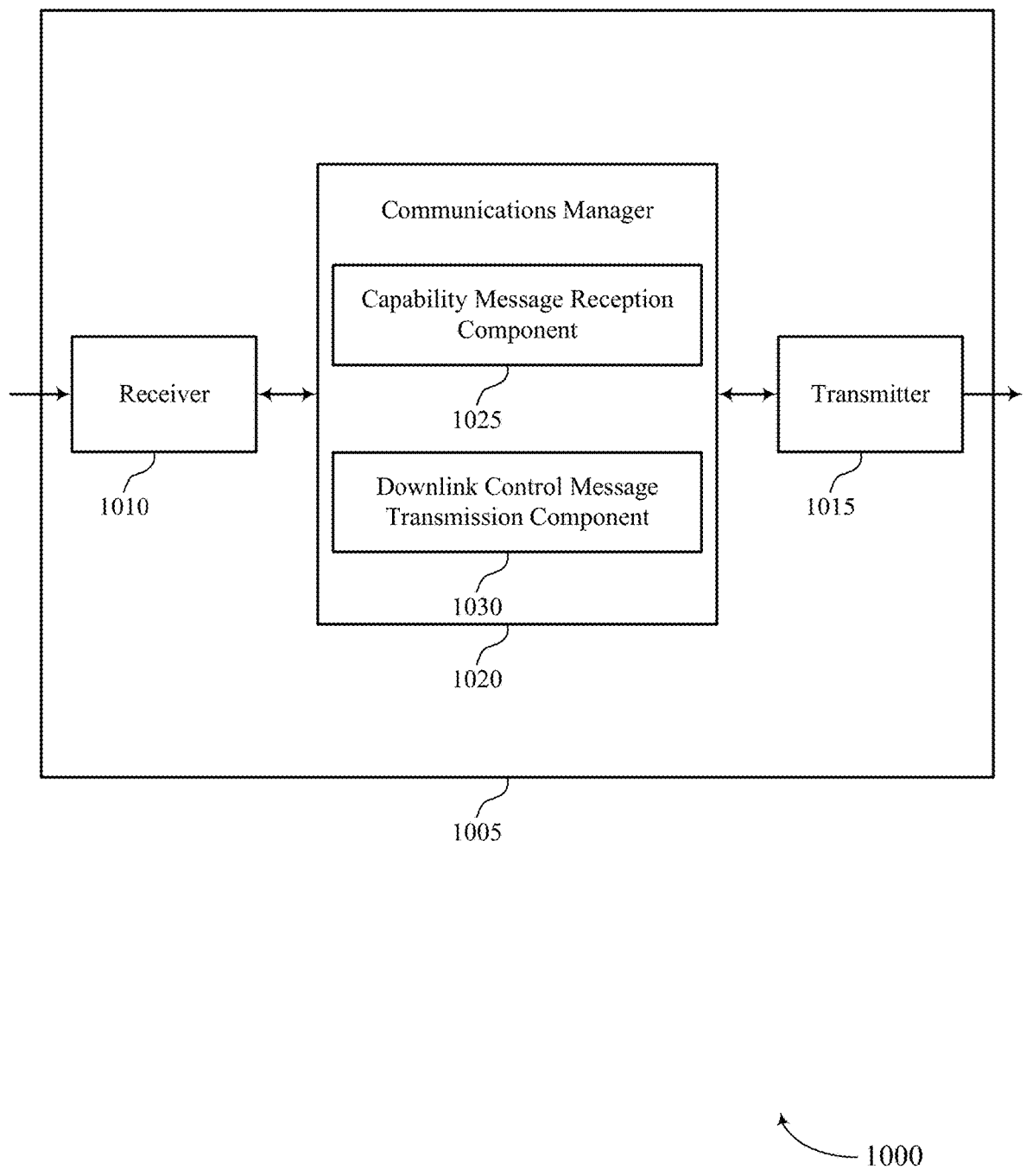

FIG. 10 shows a block diagram 1000 of a device 1005 that supports data rate decoding for transport blocks in accordance with aspects of the present disclosure. The device 1005 may be an example of aspects of a device 905 or a base station 105 as described herein. The device 1005 may include a receiver 1010, a transmitter 1015, and a communications manager 1020. The device 1005 may also include a processor. Each of these components may be in communication with one another (e.g., via one or more buses).

The receiver 1010 may provide a means for receiving information such as packets, user data, control information, or any combination thereof associated with various information channels (e.g., control channels, data channels, information channels related to data rate decoding for transport blocks). Information may be passed on to other components of the device 1005. The receiver 1010 may utilize a single antenna or a set of multiple antennas.

The transmitter 1015 may provide a means for transmitting signals generated by other components of the device 1005. For example, the transmitter 1015 may transmit information such as packets, user data, control information, or any combination thereof associated with various information channels (e.g., control channels, data channels, information channels related to data rate decoding for transport blocks). In some examples, the transmitter 1015 may be co-located with a receiver 1010 in a transceiver module. The transmitter 1015 may utilize a single antenna or a set of multiple antennas.

The device 1005, or various components thereof, may be an example of means for performing various aspects of data rate decoding for transport blocks as described herein. For example, the communications manager 1020 may include a capability message reception component 1025 a downlink control message transmission component 1030, or any combination thereof. The communications manager 1020 may be an example of aspects of a communications manager 920 as described herein. In some examples, the communications manager 1020, or various components thereof, may be configured to perform various operations (e.g., receiving, monitoring, transmitting) using or otherwise in cooperation with the receiver 1010, the transmitter 1015, or both. For example, the communications manager 1020 may receive information from the receiver 1010, send information to the transmitter 1015, or be integrated in combination with the receiver 1010, the transmitter 1015, or both to receive information, transmit information, or perform various other operations as described herein.

The communications manager 1020 may support wireless communications at a base station in accordance with examples as disclosed herein. The capability message reception component 1025 may be configured as or otherwise support a means for receiving, from a UE, a UE capability message indicating a data rate capability of the UE for a set of multiple CCs including a first CC. The downlink control message transmission component 1030 may be configured as or otherwise support a means for transmitting, to the UE, a downlink control message that schedules a first repetition and a second repetition of a transport block for a downlink shared channel in the first CC of the set of multiple CCs based on the data rate capability of the UE, where the first repetition is scheduled in a first transmission occasion of a set of multiple transmission occasions associated with the downlink shared channel and the second repetition is scheduled in a second transmission occasion of the set of multiple transmission occasions associated with the downlink shared channel.

Figure 11:
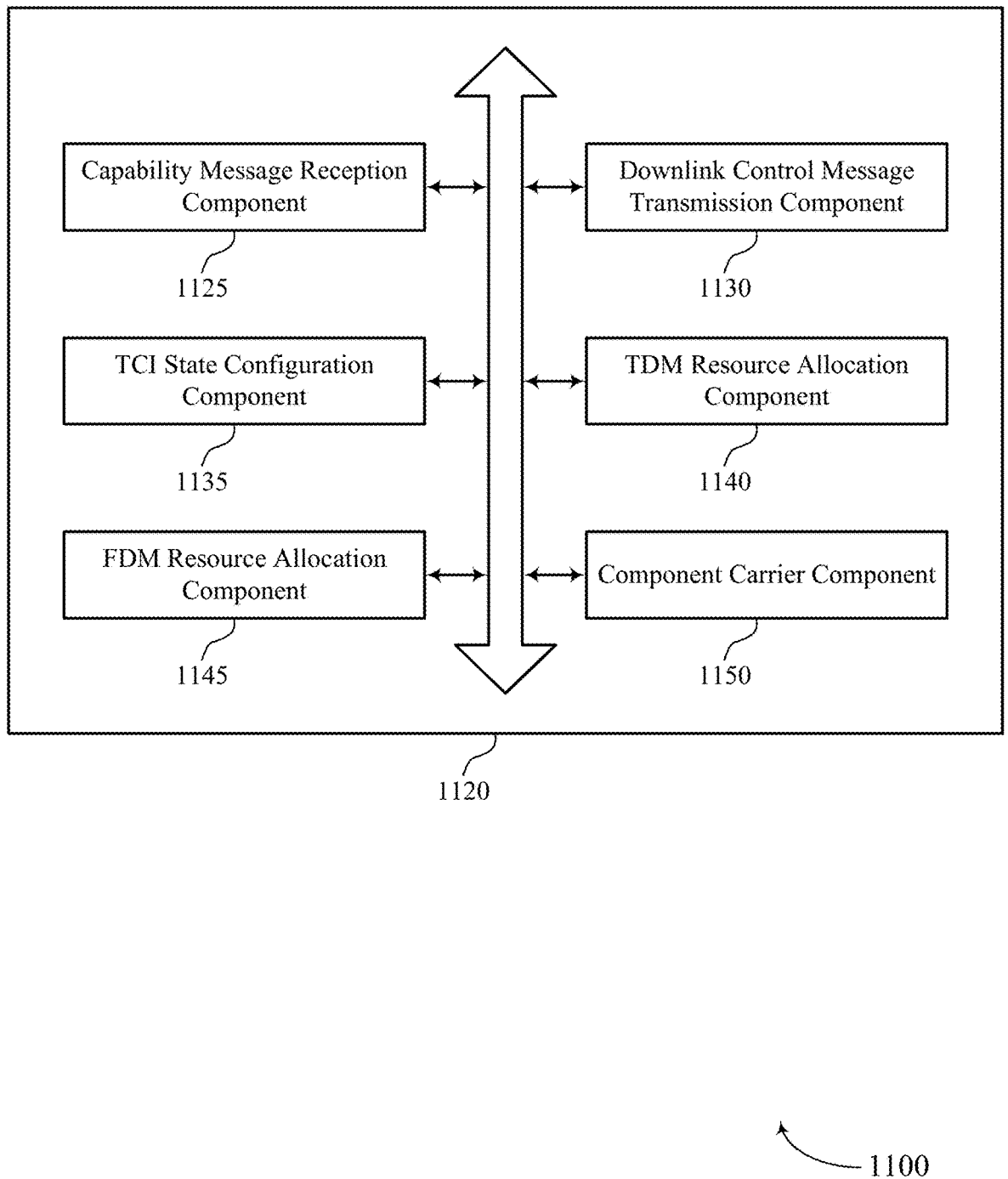
FIG. 11 shows a block diagram of a communications manager that supports data rate decoding for transport blocks in accordance with aspects of the present disclosure.

FIG. 11 shows a block diagram 1100 of a communications manager 1120 that supports data rate decoding for transport blocks in accordance with aspects of the present disclosure. The communications manager 1120 may be an example of aspects of a communications manager 920, a communications manager 1020, or both, as described herein. The communications manager 1120, or various components thereof, may be an example of means for performing various aspects of data rate decoding for transport blocks as described herein. For example, the communications manager 1120 may include a capability message reception component 1125, a downlink control message transmission component 1130, a TCI state configuration component 1135, a TDM resource allocation component 1140, an FDM resource allocation component 1145, a CC component 1150, or any combination thereof. Each of these components may communicate, directly or indirectly, with one another (e.g., via one or more buses).

The communications manager 1120 may support wireless communications at a base station in accordance with examples as disclosed herein. The capability message reception component 1125 may be configured as or otherwise support a means for receiving, from a UE, a UE capability message indicating a data rate capability of the UE for a set of multiple CCs including a first CC. The downlink control message transmission component 1130 may be configured as or otherwise support a means for transmitting, to the UE, a downlink control message that schedules a first repetition and a second repetition of a transport block for a downlink shared channel in the first CC of the set of multiple CCs based on the data rate capability of the UE, where the first repetition is scheduled in a first transmission occasion of a set of multiple transmission occasions associated with the downlink shared channel and the second repetition is scheduled in a second transmission occasion of the set of multiple transmission occasions associated with the downlink shared channel.

In some examples, the TCI state configuration component 1135 may be configured as or otherwise support a means for transmitting, to the UE, a message indicating a TCI state for transmission of the first repetition and the second repetition of the transport block for the downlink shared channel.

In some examples, to support transmitting the downlink control message, the TDM resource allocation component 1140 may be configured as or otherwise support a means for transmitting the downlink control message indicating the first transmission occasion and the second transmission occasion for the transport block, where the first transmission occasion and the second transmission occasion are non-overlapping in time.

In some examples, to support transmitting the downlink control message, the FDM resource allocation component 1145 may be configured as or otherwise support a means for transmitting the downlink control message indicating the first transmission occasion and the second transmission occasion for the transport block, where the first transmission occasion and the second transmission occasion are non-overlapping in frequency.

In some examples, the CC component 1150 may be configured as or otherwise support a means for transmitting, to the UE, a message indicating a configuration for the first CC used for transmission of the first repetition and the second repetition of the transport block for the downlink shared channel.

In some examples, the capability message reception component 1125 may be configured as or otherwise support a means for receiving, from the UE, the UE capability message indicating the data rate capability of the UE for the first CC, where a data rate limit is based on the data rate capability of the UE.

Figure 12:
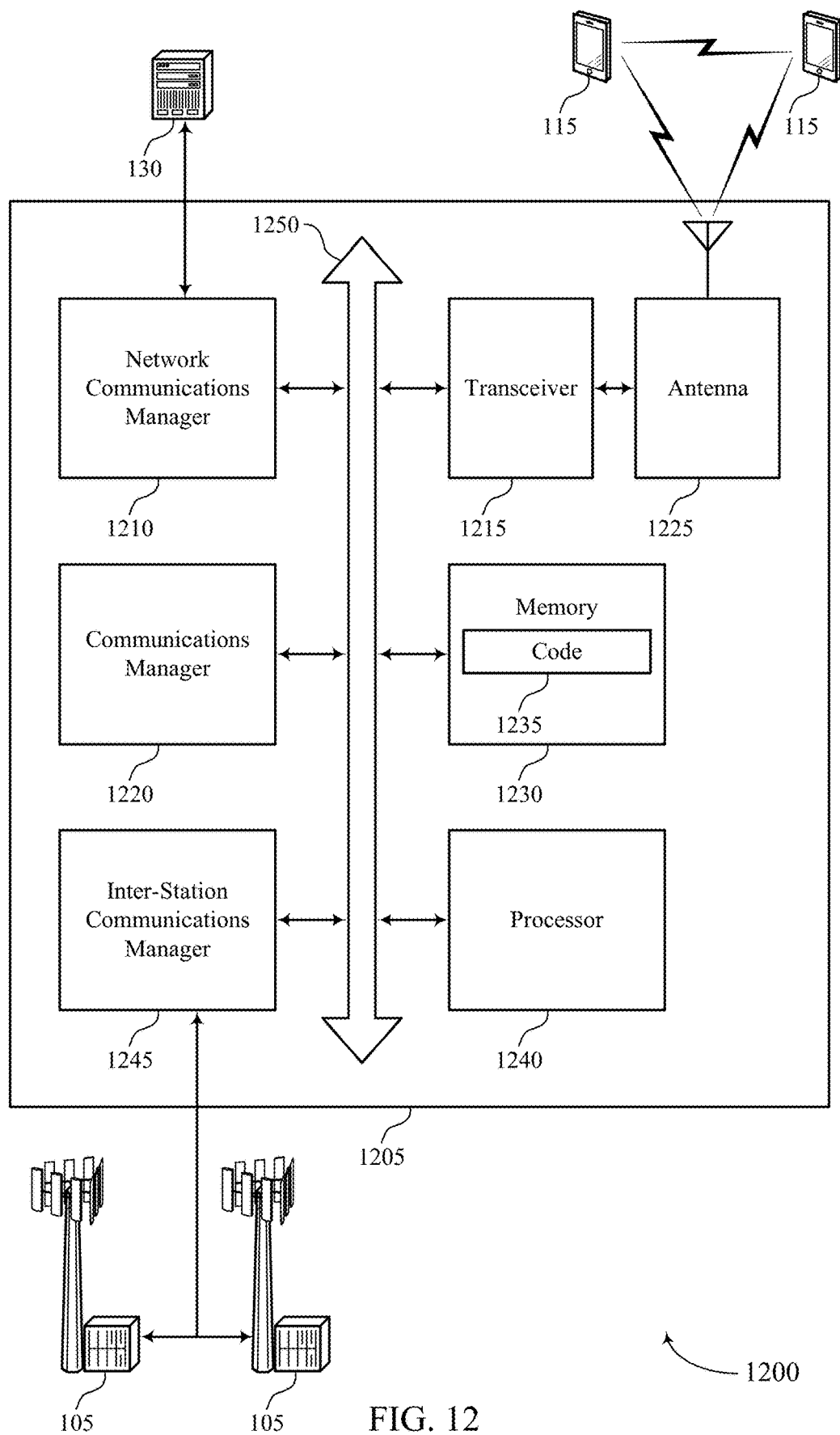
FIG. 12 shows a diagram of a system including a device that supports data rate decoding for transport blocks in accordance with aspects of the present disclosure.

FIG. 12 shows a diagram of a system 1200 including a device 1205 that supports data rate decoding for transport blocks in accordance with aspects of the present disclosure. The device 1205 may be an example of or include the components of a device 905, a device 1005, or a base station 105 as described herein. The device 1205 may communicate wirelessly with one or more base stations 105, UEs 115, or any combination thereof. The device 1205 may include components for bi-directional voice and data communications including components for transmitting and receiving communications, such as a communications manager 1220, a network communications manager 1210, a transceiver 1215, an antenna 1225, a memory 1230, code 1235, a processor 1240, and an inter-station communications manager 1245. These components may be in electronic communication or otherwise coupled (e.g., operatively, communicatively, functionally, electronically, electrically) via one or more buses (e.g., a bus 1250).

The network communications manager 1210 may manage communications with a core network 130 (e.g., via one or more wired backhaul links). For example, the network communications manager 1210 may manage the transfer of data communications for client devices, such as one or more UEs 115.

In some cases, the device 1205 may include a single antenna 1225. However, in some other cases the device 1205 may have more than one antenna 1225, which may be capable of concurrently transmitting or receiving multiple wireless transmissions. The transceiver 1215 may communicate bi-directionally, via the one or more antennas 1225, wired, or wireless links as described herein. For example, the transceiver 1215 may represent a wireless transceiver and may communicate bi-directionally with another wireless transceiver. The transceiver 1215 may also include a modem to modulate the packets, to provide the modulated packets to one or more antennas 1225 for transmission, and to demodulate packets received from the one or more antennas 1225. The transceiver 1215, or the transceiver 1215 and one or more antennas 1225, may be an example of a transmitter 915, a transmitter 1015, a receiver 910, a receiver 1010, or any combination thereof or component thereof, as described herein.

The memory 1230 may include RAM and ROM. The memory 1230 may store computer-readable, computer-executable code 1235 including instructions that, when executed by the processor 1240, cause the device 1205 to perform various functions described herein. The code 1235 may be stored in a non-transitory computer-readable medium such as system memory or another type of memory. In some cases, the code 1235 may not be directly executable by the processor 1240 but may cause a computer (e.g., when compiled and executed) to perform functions described herein. In some cases, the memory 1230 may contain, among other things, a BIOS which may control basic hardware or software operation such as the interaction with peripheral components or devices.

The processor 1240 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1240 may be configured to operate a memory array using a memory controller. In some other cases, a memory controller may be integrated into the processor 1240. The processor 1240 may be configured to execute computer-readable instructions stored in a memory (e.g., the memory 1230) to cause the device 1205 to perform various functions (e.g., functions or tasks supporting data rate decoding for transport blocks). For example, the device 1205 or a component of the device 1205 may include a processor 1240 and memory 1230 coupled to the processor 1240, the processor 1240 and memory 1230 configured to perform various functions described herein.

The inter-station communications manager 1245 may manage communications with other base stations 105, and may include a controller or scheduler for controlling communications with UEs 115 in cooperation with other base stations 105. For example, the inter-station communications manager 1245 may coordinate scheduling for transmissions to UEs 115 for various interference mitigation techniques such as beamforming or joint transmission. In some examples, the inter-station communications manager 1245 may provide an X2 interface within an LTE/LTE-A wireless communications network technology to provide communication between base stations 105.

The communications manager 1220 may support wireless communications at a base station in accordance with examples as disclosed herein. For example, the communications manager 1220 may be configured as or otherwise support a means for receiving, from a UE, a UE capability message indicating a data rate capability of the UE for a set of multiple CCs including a first CC. The communications manager 1220 may be configured as or otherwise support a means for transmitting, to the UE, a downlink control message that schedules a first repetition and a second repetition of a transport block for a downlink shared channel in the first CC of the set of multiple CCs based on the data rate capability of the UE, where the first repetition is scheduled in a first transmission occasion of a set of multiple transmission occasions associated with the downlink shared channel and the second repetition is scheduled in a second transmission occasion of the set of multiple transmission occasions associated with the downlink shared channel.

By including or configuring the communications manager 1220 in accordance with examples as described herein, the device 1205 may support techniques for data rate decoding for transport blocks, which may reduce power consumption and improve coordination between devices. Further, the supported techniques may improve network operations and promote network efficiencies.

In some examples, the communications manager 1220 may be configured to perform various operations (e.g., receiving, monitoring, transmitting) using or otherwise in cooperation with the transceiver 1215, the one or more antennas 1225, or any combination thereof. Although the communications manager 1220 is illustrated as a separate component, in some examples, one or more functions described with reference to the communications manager 1220 may be supported by or performed by the processor 1240, the memory 1230, the code 1235, or any combination thereof. For example, the code 1235 may include instructions executable by the processor 1240 to cause the device 1205 to perform various aspects of data rate decoding for transport blocks as described herein, or the processor 1240 and the memory 1230 may be otherwise configured to perform or support such operations.

Figure 13:
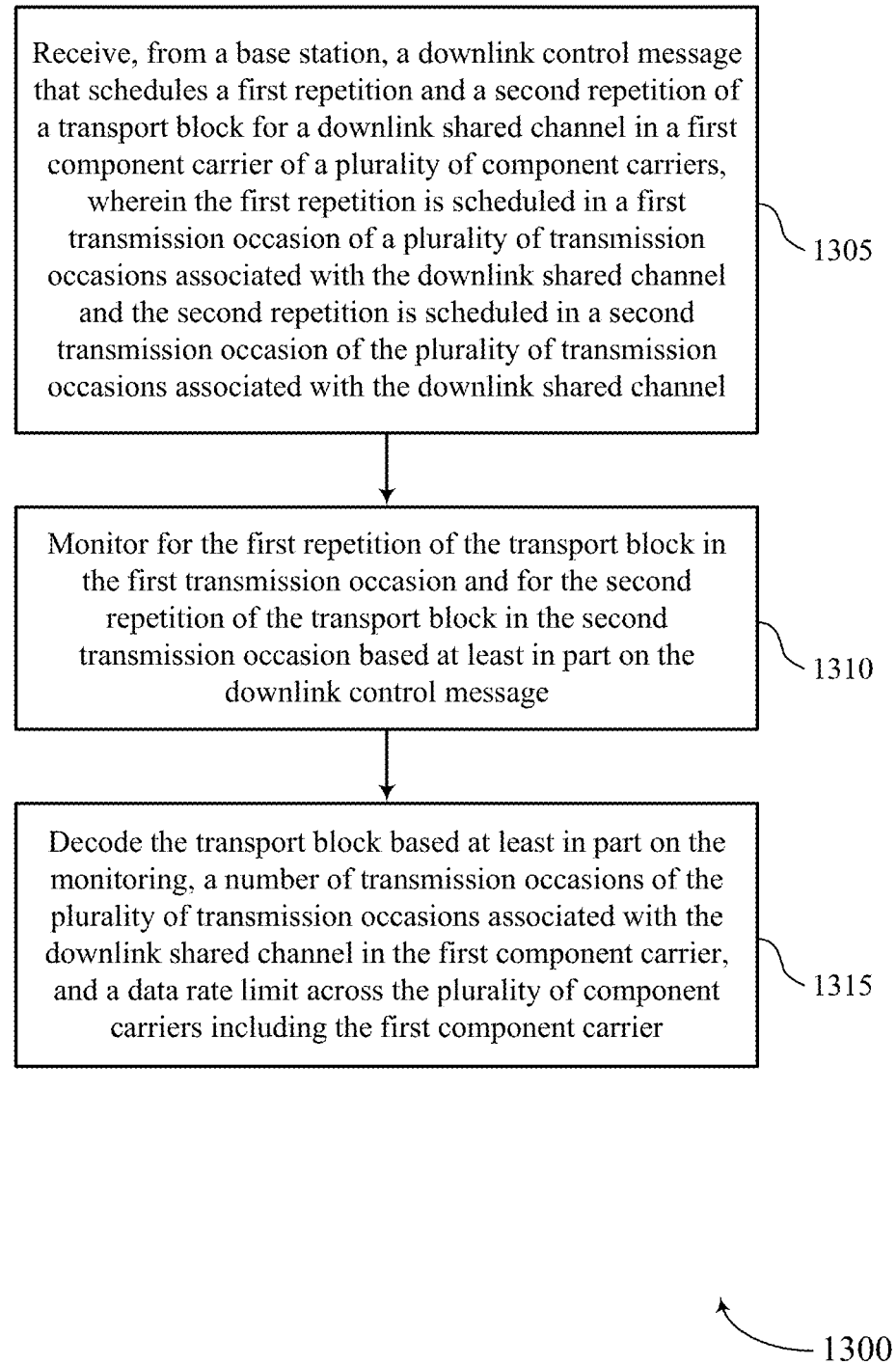
FIGS. 13 through 17 show flowcharts illustrating methods that support data rate decoding for transport blocks in accordance with aspects of the present disclosure.

FIG. 13 shows a flowchart illustrating a method 1300 that supports data rate decoding for transport blocks in accordance with aspects of the present disclosure. The operations of the method 1300 may be implemented by a UE or its components as described herein. For example, the operations of the method 1300 may be performed by a UE 115 as described with reference to FIGS. 1 through 8. In some examples, a UE may execute a set of instructions to control the functional elements of the UE to perform the described functions. Additionally, or alternatively, the UE may perform aspects of the described functions using special-purpose hardware.

At 1305, the method may include receiving, from a base station, a downlink control message that schedules a first repetition and a second repetition of a transport block for a downlink shared channel in a first CC of a set of multiple CCs, where the first repetition is scheduled in a first transmission occasion of a set of multiple transmission occasions associated with the downlink shared channel and the second repetition is scheduled in a second transmission occasion of the set of multiple transmission occasions associated with the downlink shared channel. The operations of 1305 may be performed in accordance with examples as disclosed herein. In some examples, aspects of the operations of 1305 may be performed by a downlink control message reception component 725 as described with reference to FIG. 7.

At 1310, the method may include monitoring for the first repetition of the transport block in the first transmission occasion and for the second repetition of the transport block in the second transmission occasion based on the downlink control message. The operations of 1310 may be performed in accordance with examples as disclosed herein. In some examples, aspects of the operations of 1310 may be performed by a monitoring component 730 as described with reference to FIG. 7.

At 1315, the method may include decoding the transport block based on the monitoring, a number of transmission occasions of the set of multiple transmission occasions associated with the downlink shared channel in the first CC, and a data rate limit across the set of multiple CCs including the first CC. The operations of 1315 may be performed in accordance with examples as disclosed herein. In some examples, aspects of the operations of 1315 may be performed by a decoding component 735 as described with reference to FIG. 7.

Figure 14:
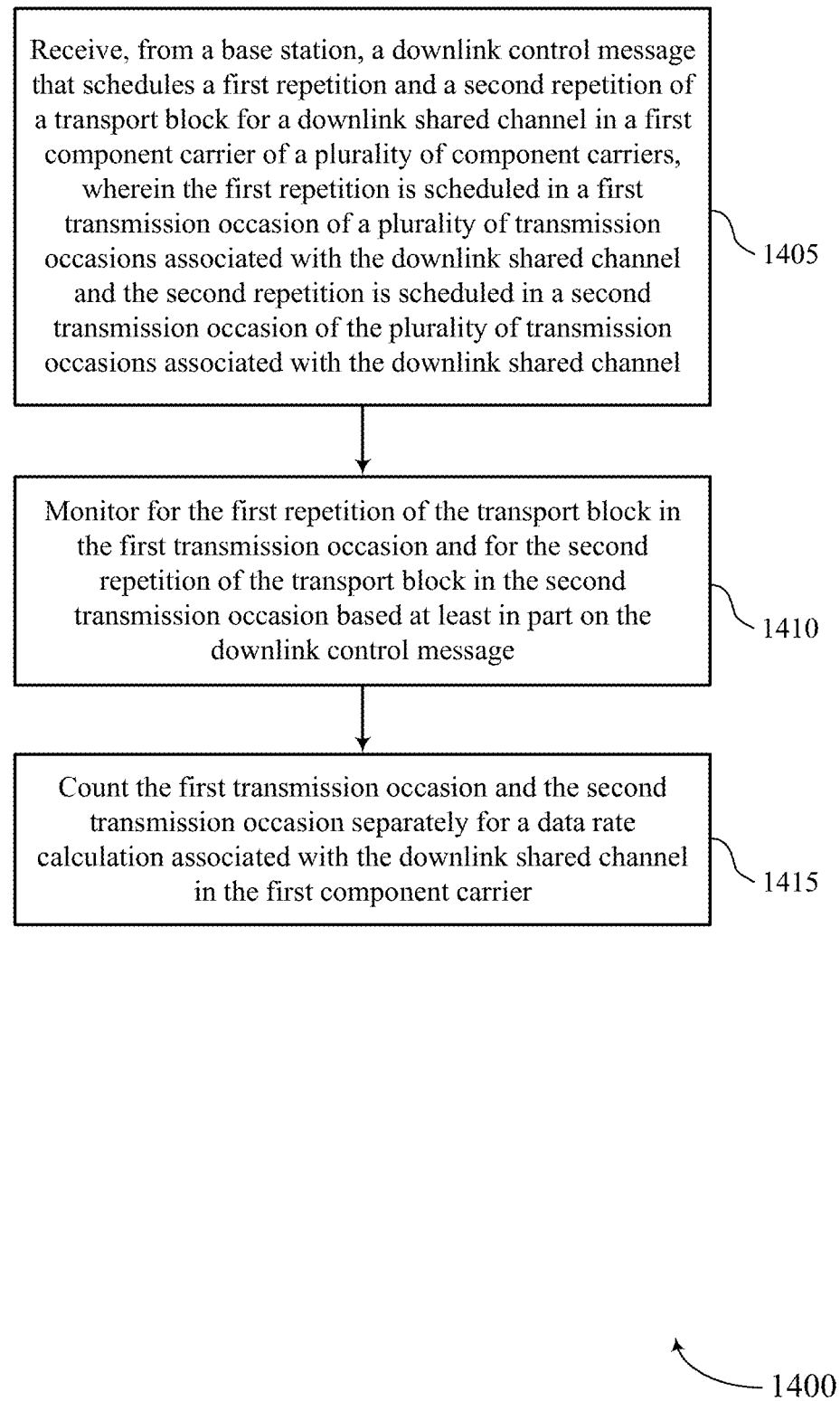

FIG. 14 shows a flowchart illustrating a method 1400 that supports data rate decoding for transport blocks in accordance with aspects of the present disclosure. The operations of the method 1400 may be implemented by a UE or its components as described herein. For example, the operations of the method 1400 may be performed by a UE 115 as described with reference to FIGS. 1 through 8. In some examples, a UE may execute a set of instructions to control the functional elements of the UE to perform the described functions. Additionally, or alternatively, the UE may perform aspects of the described functions using special-purpose hardware.

At 1405, the method may include receiving, from a base station, a downlink control message that schedules a first repetition and a second repetition of a transport block for a downlink shared channel in a first CC of a set of multiple CCs, where the first repetition is scheduled in a first transmission occasion of a set of multiple transmission occasions associated with the downlink shared channel and the second repetition is scheduled in a second transmission occasion of the set of multiple transmission occasions associated with the downlink shared channel. The operations of 1405 may be performed in accordance with examples as disclosed herein. In some examples, aspects of the operations of 1405 may be performed by a downlink control message reception component 725 as described with reference to FIG. 7.

At 1410, the method may include monitoring for the first repetition of the transport block in the first transmission occasion and for the second repetition of the transport block in the second transmission occasion based on the downlink control message. The operations of 1410 may be performed in accordance with examples as disclosed herein. In some examples, aspects of the operations of 1410 may be performed by a monitoring component 730 as described with reference to FIG. 7.

At 1415, the method may include counting the first transmission occasion and the second transmission occasion separately for a data rate calculation associated with the downlink shared channel in the first CC. The operations of 1415 may be performed in accordance with examples as disclosed herein. In some examples, aspects of the operations of 1415 may be performed by a decoding component 735 as described with reference to FIG. 7.

Figure 15:
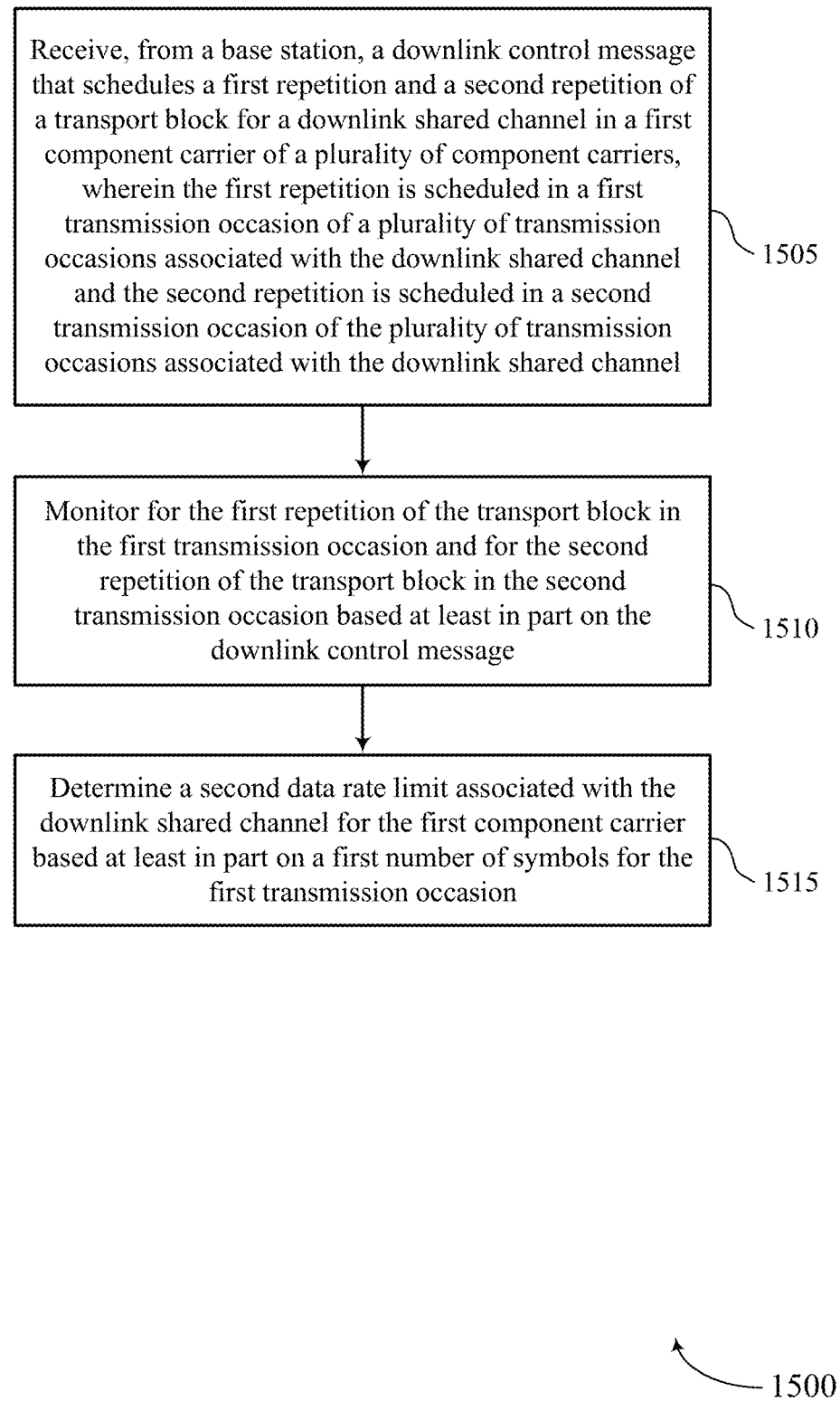

FIG. 15 shows a flowchart illustrating a method 1500 that supports data rate decoding for transport blocks in accordance with aspects of the present disclosure. The operations of the method 1500 may be implemented by a UE or its components as described herein. For example, the operations of the method 1500 may be performed by a UE 115 as described with reference to FIGS. 1 through 8. In some examples, a UE may execute a set of instructions to control the functional elements of the UE to perform the described functions. Additionally, or alternatively, the UE may perform aspects of the described functions using special-purpose hardware.

At 1505, the method may include receiving, from a base station, a downlink control message that schedules a first repetition and a second repetition of a transport block for a downlink shared channel in a first CC of a set of multiple CCs, where the first repetition is scheduled in a first transmission occasion of a set of multiple transmission occasions associated with the downlink shared channel and the second repetition is scheduled in a second transmission occasion of the set of multiple transmission occasions associated with the downlink shared channel. The operations of 1505 may be performed in accordance with examples as disclosed herein. In some examples, aspects of the operations of 1505 may be performed by a downlink control message reception component 725 as described with reference to FIG. 7.

At 1510, the method may include monitoring for the first repetition of the transport block in the first transmission occasion and for the second repetition of the transport block in the second transmission occasion based on the downlink control message. The operations of 1510 may be performed in accordance with examples as disclosed herein. In some examples, aspects of the operations of 1510 may be performed by a monitoring component 730 as described with reference to FIG. 7.

At 1515, the method may include determining a second data rate limit associated with the downlink shared channel for the first CC based on a first number of symbols for the first transmission occasion. The operations of 1515 may be performed in accordance with examples as disclosed herein. In some examples, aspects of the operations of 1515 may be performed by a decoding component 735 as described with reference to FIG. 7.

Figure 16:
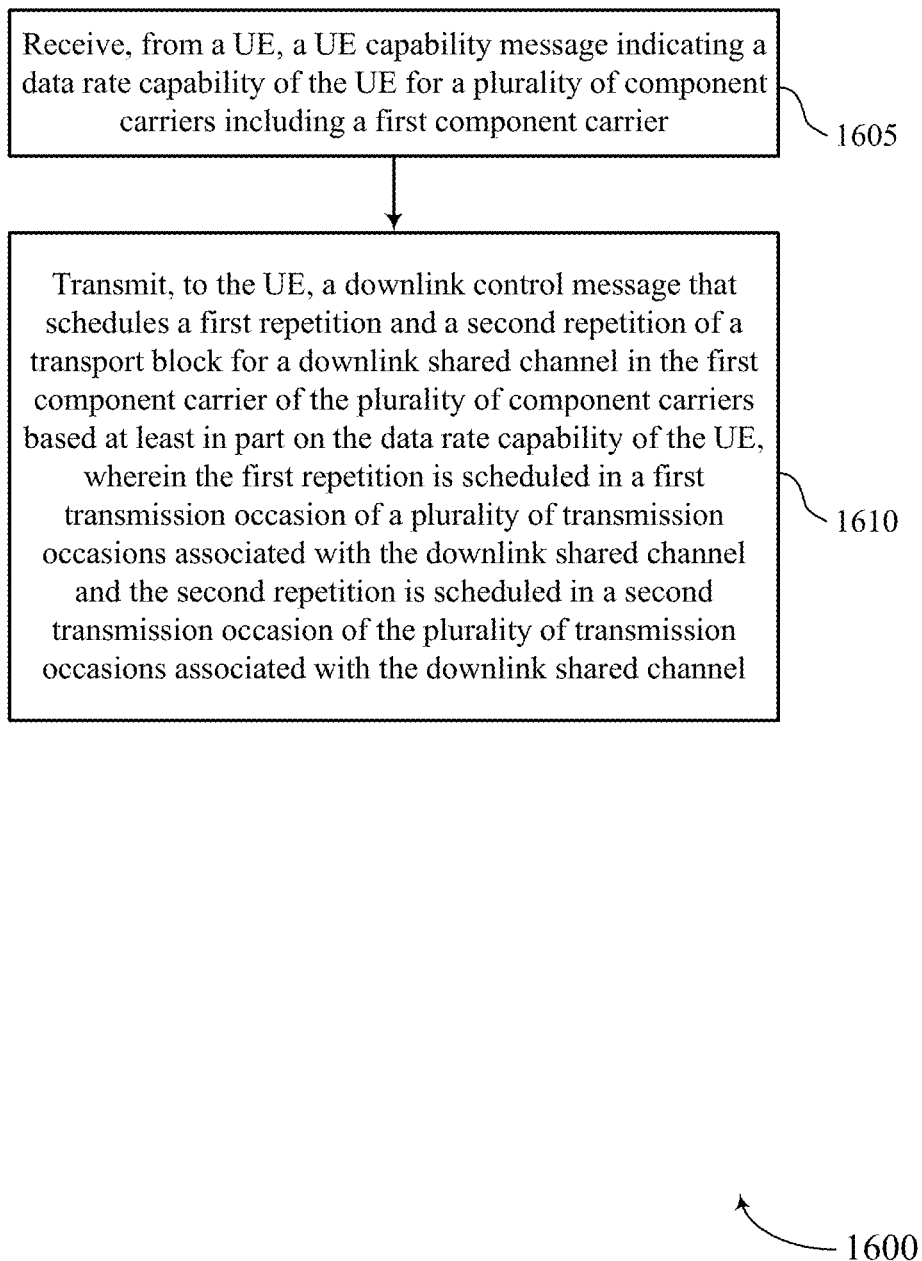

FIG. 16 shows a flowchart illustrating a method 1600 that supports data rate decoding for transport blocks in accordance with aspects of the present disclosure. The operations of the method 1600 may be implemented by a base station or its components as described herein. For example, the operations of the method 1600 may be performed by a base station 105 as described with reference to FIGS. 1 through 4 and 9 through 12. In some examples, a base station may execute a set of instructions to control the functional elements of the base station to perform the described functions. Additionally, or alternatively, the base station may perform aspects of the described functions using special-purpose hardware.

At 1605, the method may include receiving, from a UE, a UE capability message indicating a data rate capability of the UE for a set of multiple CCs including a first CC. The operations of 1605 may be performed in accordance with examples as disclosed herein. In some examples, aspects of the operations of 1605 may be performed by a capability message reception component 1125 as described with reference to FIG. 11.

At 1610, the method may include transmitting, to the UE, a downlink control message that schedules a first repetition and a second repetition of a transport block for a downlink shared channel in the first CC of the set of multiple CCs based on the data rate capability of the UE, where the first repetition is scheduled in a first transmission occasion of a set of multiple transmission occasions associated with the downlink shared channel and the second repetition is scheduled in a second transmission occasion of the set of multiple transmission occasions associated with the downlink shared channel. The operations of 1610 may be performed in accordance with examples as disclosed herein. In some examples, aspects of the operations of 1610 may be performed by a downlink control message transmission component 1130 as described with reference to FIG. 11.

Figure 17:
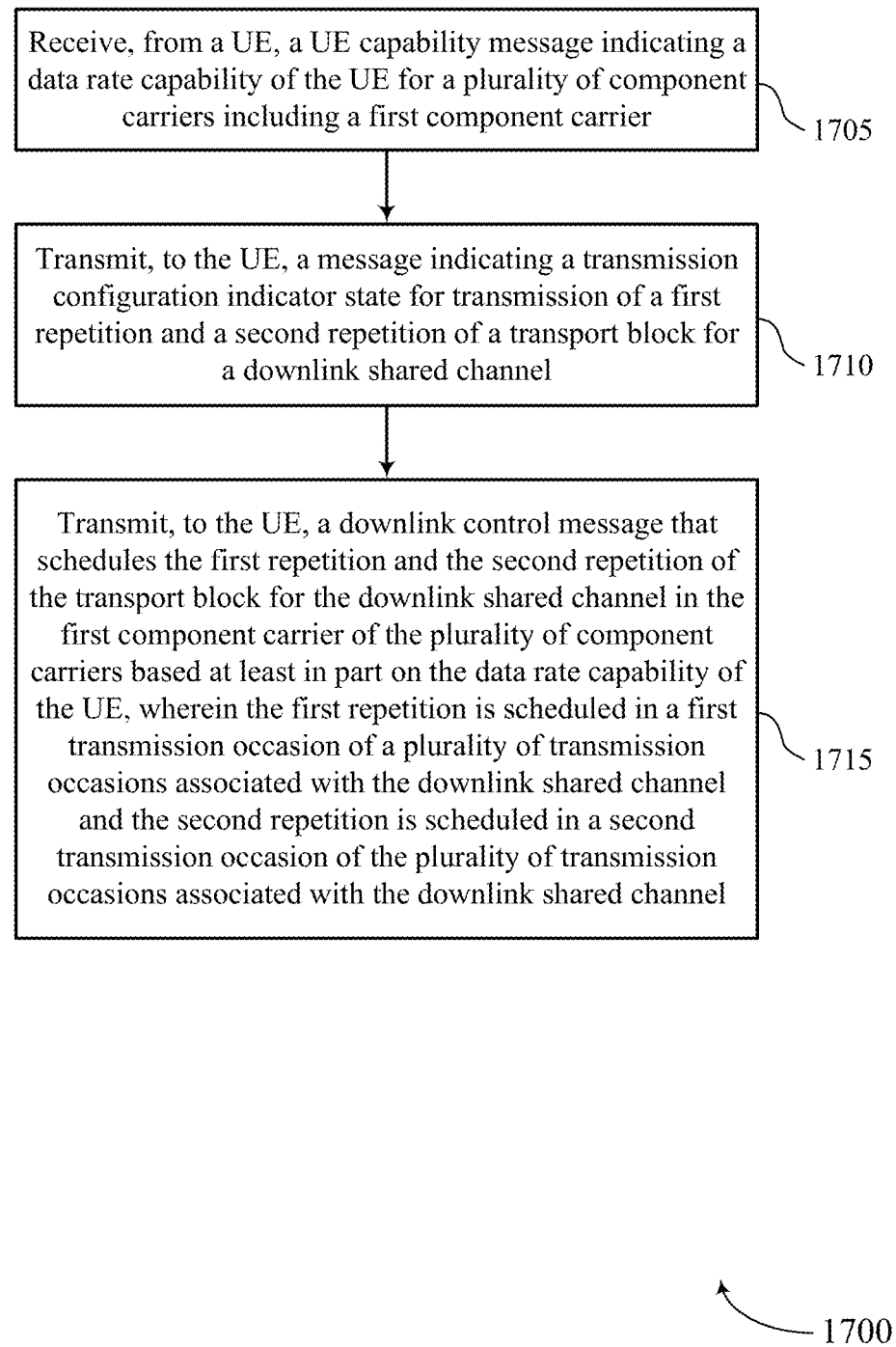

FIG. 17 shows a flowchart illustrating a method 1700 that supports data rate decoding for transport blocks in accordance with aspects of the present disclosure. The operations of the method 1700 may be implemented by a base station or its components as described herein. For example, the operations of the method 1700 may be performed by a base station 105 as described with reference to FIGS. 1 through 4 and 9 through 12. In some examples, a base station may execute a set of instructions to control the functional elements of the base station to perform the described functions. Additionally, or alternatively, the base station may perform aspects of the described functions using special-purpose hardware.

At 1705, the method may include receiving, from a UE, a UE capability message indicating a data rate capability of the UE for a set of multiple CCs including a first CC. The operations of 1705 may be performed in accordance with examples as disclosed herein. In some examples, aspects of the operations of 1705 may be performed by a capability message reception component 1125 as described with reference to FIG. 11.

At 1710, the method may include transmitting, to the UE, a message indicating a TCI state for transmission of a first repetition and a second repetition of a transport block for a downlink shared channel. The operations of 1710 may be performed in accordance with examples as disclosed herein. In some examples, aspects of the operations of 1710 may be performed by a TCI state configuration component 1135 as described with reference to FIG. 11.

At 1715, the method may include transmitting, to the UE, a downlink control message that schedules the first repetition and the second repetition of the transport block for the downlink shared channel in the first CC of the set of multiple CCs based on the data rate capability of the UE, where the first repetition is scheduled in a first transmission occasion of a set of multiple transmission occasions associated with the downlink shared channel and the second repetition is scheduled in a second transmission occasion of the set of multiple transmission occasions associated with the downlink shared channel. The operations of 1715 may be performed in accordance with examples as disclosed herein. In some examples, aspects of the operations of 1715 may be performed by a downlink control message transmission component 1130 as described with reference to FIG. 11.

The following provides an overview of aspects of the present disclosure:

Aspect 1: A method for wireless communications at a UE, comprising: receiving, from a base station, a downlink control message that schedules a first repetition and a second repetition of a transport block for a downlink shared channel in a first CC of a plurality of CCs, wherein the first repetition is scheduled in a first transmission occasion of a plurality of transmission occasions associated with the downlink shared channel and the second repetition is scheduled in a second transmission occasion of the plurality of transmission occasions associated with the downlink shared channel; monitoring for the first repetition of the transport block in the first transmission occasion and for the second repetition of the transport block in the second transmission occasion based at least in part on the downlink control message; and decoding the transport block based at least in part on the monitoring, a number of transmission occasions of the plurality of transmission occasions associated with the downlink shared channel in the first CC, and a data rate limit across the plurality of CCs including the first CC.

Aspect 2: The method of aspect 1, wherein decoding the transport block comprises: counting the first transmission occasion and the second transmission occasion separately for a data rate calculation associated with the downlink shared channel in the first CC.

Aspect 3: The method of any of aspects 1 through 2, wherein the data rate limit is based at least in part on a data rate capability of the UE, a number of information bits of the transport block, and the number of transmission occasions of the plurality of transmission occasions associated with the downlink shared channel in the first CC.

Aspect 4: The method of any of aspects 1 through 3, wherein decoding the transport block comprises: determining a second data rate limit associated with the downlink shared channel for the first CC based at least in part on a first number of symbols for the first transmission occasion.

Aspect 5: The method of any of aspect 4, further comprising: transmitting, to the base station, a UE capability message indicating a data rate capability of the UE for the first CC, wherein the data rate limit is based at least in part on the data rate capability of the UE.

Aspect 6: The method of any of aspects 4 through 5, further comprising: determining a third data rate limit associated with the downlink shared channel for the first CC based at least in part on a second number of symbols for the second transmission occasion.

Aspect 7: The method of any of aspects 4 through 6, further comprising: determining a respective data rate for each of the first and second transmission occasions based at least in part on the second data rate limit for the first CC, wherein the first CC is configured with an enhanced downlink shared channel processing time.

Aspect 8: The method of any of aspects 4 through 7, further comprising: determining a respective data rate for each of the first and second transmission occasions based at least in part on the second data rate limit for the first CC, wherein the downlink shared channel is a retransmission of a second downlink shared channel.

Aspect 9: The method of aspect 8, wherein determining the respective data rate comprises: determining the respective data rate for each of the first and second transmission occasions based at least in part on a modulation and coding scheme.

Aspect 10: The method of any of aspects 8 through 9, further comprising: determining a TBS based at least in part on the second downlink shared channel.

Aspect 11: The method of any of aspects 8 through 10, wherein the second data rate limit for the first CC is half of a data rate capability of the UE for the first CC, wherein the first transmission occasion and the second transmission occasion are non-overlapping in frequency.

Aspect 12: The method of any of aspects 1 through 11, wherein receiving the downlink control message comprises: receiving the downlink control message indicating the first transmission occasion and the second transmission occasion for the transport block, wherein the first transmission occasion and the second transmission occasion are non-overlapping in time.

Aspect 13: The method of any of aspects 1 through 12, wherein receiving the downlink control message comprises: receiving the downlink control message indicating the first transmission occasion and the second transmission occasion for the transport block, wherein the first transmission occasion and the second transmission occasion are non-overlapping in frequency.

Aspect 14: The method of any of aspects 1 through 3, further comprising: receiving, from the base station, a message indicating a TCI state for transmission of the first repetition and the second repetition of the transport block for the downlink shared channel.

Aspect 14: The method of any of aspects 1 through 13, further comprising: receiving, from the base station, a message indicating a configuration for the first CC used for transmission of the first repetition and the second repetition of the transport block for the downlink shared channel.

Aspect 15: The method of any of aspects 1 through 14, wherein the second data rate limit for the first CC is half of the data rate capability of the UE for the first CC, wherein the first transmission occasion and the second transmission occasion are non-overlapping in frequency.

Aspect 16: The method of any of aspects 1 through 15, further comprising: transmitting, to the base station, a UE capability message indicating a data rate capability of the UE for the plurality of CCs including the first CC, wherein the data rate limit is based at least in part on the data rate capability of the UE.

Aspect 17: A method for wireless communications at a base station, comprising: receiving, from a UE, a UE capability message indicating a data rate capability of the UE for a plurality of CCs including a first CC; and transmitting, to the UE, a downlink control message that schedules a first repetition and a second repetition of a transport block for a downlink shared channel in the first CC of the plurality of CCs based at least in part on the data rate capability of the UE, wherein the first repetition is scheduled in a first transmission occasion of a plurality of transmission occasions associated with the downlink shared channel and the second repetition is scheduled in a second transmission occasion of the plurality of transmission occasions associated with the downlink shared channel.

Aspect 18: The method of aspect 17, further comprising: transmitting, to the UE, a message indicating a TCI state for transmission of the first repetition and the second repetition of the transport block for the downlink shared channel.

Aspect 19: The method of any of aspects 17 through 18, wherein transmitting the downlink control message comprises: transmitting the downlink control message indicating the first transmission occasion and the second transmission occasion for the transport block, wherein the first transmission occasion and the second transmission occasion are non-overlapping in time.

Aspect 20: The method of any of aspects 17 through 19, wherein transmitting the downlink control message comprises: transmitting the downlink control message indicating the first transmission occasion and the second transmission occasion for the transport block, wherein the first transmission occasion and the second transmission occasion are non-overlapping in frequency.

Aspect 21: The method of any of aspects 17 through 20, further comprising: transmitting, to the UE, a message indicating a configuration for the first CC used for transmission of the first repetition and the second repetition of the transport block for the downlink shared channel.

Aspect 22: The method of any of aspects 17 through 21, further comprising: receiving, from the UE, the UE capability message indicating the data rate capability of the UE for the first CC, wherein a data rate limit is based at least in part on the data rate capability of the UE.

Aspect 23: An apparatus for wireless communications at a UE, comprising a processor; memory coupled with the processor; and instructions stored in the memory and executable by the processor to cause the apparatus to perform a method of any of aspects 1 through 16.

Aspect 24: An apparatus for wireless communications at a UE, comprising at least one means for performing a method of any of aspects 1 through 16.

Aspect 25: A non-transitory computer-readable medium storing code for wireless communications at a UE, the code comprising instructions executable by a processor to perform a method of any of aspects 1 through 16.

Aspect 26: An apparatus for wireless communications at a base station, comprising a processor; memory coupled with the processor; and instructions stored in the memory and executable by the processor to cause the apparatus to perform a method of any of aspects 17 through 22.

Aspect 27: An apparatus for wireless communications at a base station, comprising at least one means for performing a method of any of aspects 17 through 22.

Aspect 28: A non-transitory computer-readable medium storing code for wireless communications at a base station, the code comprising instructions executable by a processor to perform a method of any of aspects 17 through 22.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a wide variety of actions and, therefore, "determining" can include calculating, computing, processing, deriving, investigating, looking up (such as via looking up in a table, a database or another data structure), ascertaining and the like. Also, "determining" can include receiving (such as receiving information), accessing (such as accessing data in a memory) and the like. Also, "determining" can include resolving, selecting, choosing, establishing and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A user equipment (UE), comprising:
one or more memories storing processor-executable code; and
one or more processors coupled with the one or more memories and individually or collectively operable to execute the code to cause the UE to:
receive, from a network device, a downlink control message that schedules a first repetition and a second repetition of a transport block for a downlink shared channel in a first component carrier of a plurality of component carriers, wherein the first repetition is scheduled in a first transmission occasion of a plurality of transmission occasions associated with the downlink shared channel and the second repetition is scheduled in a second transmission occasion of the plurality of transmission occasions associated with the downlink shared channel, and wherein the first transmission occasion and the second transmission occasion are included in a time slot;
monitor for the first repetition of the transport block in the first transmission occasion and for the second repetition of the transport block in the second transmission occasion based at least in part on the downlink control message;
count the first transmission occasion and the second transmission occasion separately for a data rate calculation associated with the plurality of component carriers; and
decode the transport block based at least in part on the monitoring, the data rate calculation, a number of transmission occasions of the plurality of transmission occasions associated with the downlink shared channel in the first component carrier, and a data rate limit across the plurality of component carriers including the first component carrier.

2. The UE of claim 1, wherein the data rate limit is based at least in part on a data rate capability of the UE, a number of information bits of the transport block, and the number of transmission occasions of the plurality of transmission occasions associated with the downlink shared channel in the first component carrier.

3. The UE of claim 1, wherein to decode the transport block, the one or more processors are individually or collectively further operable to execute the code to cause the UE to:
determine a second data rate limit associated with the downlink shared channel for the first component carrier based at least in part on a first number of symbols for the first transmission occasion.

4. The UE of claim 3, wherein the one or more processors are individually or collectively further operable to execute the code to cause the UE to:
transmit, to the network device, a UE capability message indicating a data rate capability of the UE for the first component carrier, wherein the data rate limit is based at least in part on the data rate capability of the UE.

5. The UE of claim 3, wherein the one or more processors are individually or collectively further operable to execute the code to cause the UE to:
determine a third data rate limit associated with the downlink shared channel for the first component carrier based at least in part on a second number of symbols for the second transmission occasion.

6. The UE of claim 3, wherein the one or more processors are individually or collectively further operable to execute the code to cause the UE to:
determine a respective data rate for each of the first and second transmission occasions based at least in part on the second data rate limit for the first component carrier, wherein the first component carrier is configured with an enhanced downlink shared channel processing time.

7. The UE of claim 3, wherein the one or more processors are individually or collectively further operable to execute the code to cause the UE to:
determine a respective data rate for each of the first and second transmission occasions based at least in part on the second data rate limit for the first component carrier, wherein the downlink shared channel is a retransmission of a second downlink shared channel.

8. The UE of claim 7, wherein to determine the respective data rate, the one or more processors are individually or collectively further operable to execute the code to cause the UE to:
determine the respective data rate for each of the first and second transmission occasions based at least in part on a modulation and coding scheme.

9. The UE of claim 7, wherein the one or more processors are individually or collectively further operable to execute the code to cause the UE to:
determine a transport block size based at least in part on the second downlink shared channel.

10. The UE of claim 3, wherein the second data rate limit for the first component carrier is half of a data rate capability of the UE for the first component carrier, wherein the first transmission occasion and the second transmission occasion are non-overlapping in frequency.

11. The UE of claim 1, wherein to receive the downlink control message, the one or more processors are individually or collectively further operable to execute the code to cause the UE to:
receive the downlink control message indicating the first transmission occasion and the second transmission occasion for the transport block, wherein the first transmission occasion and the second transmission occasion are non-overlapping in time.

12. The UE of claim 1, wherein to receive the downlink control message, the one or more processors are individually or collectively further operable to execute the code to cause the UE to:
receive the downlink control message indicating the first transmission occasion and the second transmission occasion for the transport block, wherein the first transmission occasion and the second transmission occasion are non-overlapping in frequency.

13. The UE of claim 1, wherein the one or more processors are individually or collectively further operable to execute the code to cause the UE to:
receive, from the network device, a message indicating a transmission configuration indicator state for transmission of the first repetition and the second repetition of the transport block for the downlink shared channel.

14. The UE of claim 1, wherein the one or more processors are individually or collectively further operable to execute the code to cause the UE to:
receive, from the network device, a message indicating a configuration for the first component carrier used for transmission of the first repetition and the second repetition of the transport block for the downlink shared channel.

15. The UE of claim 1, wherein the one or more processors are individually or collectively further operable to execute the code to cause the UE to:
transmit, to the network device, a UE capability message indicating a data rate capability of the UE for the plurality of component carriers including the first component carrier, wherein the data rate limit is based at least in part on the data rate capability of the UE.

16. A network device, comprising:
one or more memories storing processor-executable code; and
one or more processors coupled with the one or more memories and individually or collectively operable to execute the code to cause the network device to:
receive, from a user equipment (UE), a UE capability message indicating a data rate capability of the UE for a plurality of component carriers including a first component carrier; and
transmit, to the UE, a downlink control message that schedules a first repetition and a second repetition of a transport block for a downlink shared channel in the first component carrier of the plurality of component carriers based at least in part on the data rate capability of the UE, wherein the first repetition is scheduled in a first transmission occasion of a plurality of transmission occasions associated with the downlink shared channel and the second repetition is scheduled in a second transmission occasion of the plurality of transmission occasions associated with the downlink shared channel, and wherein the first transmission occasion and the second transmission occasion are included in a time slot.

17. The network device of claim 16, wherein the one or more processors are individually or collectively further operable to execute the code to cause the network device to:
transmit, to the UE, a message indicating a transmission configuration indicator state for transmission of the first repetition and the second repetition of the transport block for the downlink shared channel.

18. The network device of claim 16, wherein to transmit the downlink control message, the one or more processors are individually or collectively further operable to execute the code to cause the network device to:
transmit the downlink control message indicating the first transmission occasion and the second transmission occasion for the transport block, wherein the first transmission occasion and the second transmission occasion are non-overlapping in time.

19. The network device of claim 16, wherein to transmit the downlink control message, the one or more processors are individually or collectively further operable to execute the code to cause the network device to:
transmit the downlink control message indicating the first transmission occasion and the second transmission occasion for the transport block, wherein the first transmission occasion and the second transmission occasion are non-overlapping in frequency.

20. The network device of claim 16, wherein the one or more processors are individually or collectively further operable to execute the code to cause the network device to:
transmit, to the UE, a message indicating a configuration for the first component carrier used for transmission of the first repetition and the second repetition of the transport block for the downlink shared channel.

21. The network device of claim 16, wherein the one or more processors are individually or collectively further operable to execute the code to cause the network device to:
receive, from the UE, the UE capability message indicating the data rate capability of the UE for the first component carrier, wherein a data rate limit is based at least in part on the data rate capability of the UE.

22. A method for wireless communications at a user equipment (UE), comprising:
receiving, from a network device, a downlink control message that schedules a first repetition and a second repetition of a transport block for a downlink shared channel in a first component carrier of a plurality of component carriers, wherein the first repetition is scheduled in a first transmission occasion of a plurality of transmission occasions associated with the downlink shared channel and the second repetition is scheduled in a second transmission occasion of the plurality of transmission occasions associated with the downlink shared channel, and wherein the first transmission occasion and the second transmission occasion are included in a time slot;
monitoring for the first repetition of the transport block in the first transmission occasion and for the second repetition of the transport block in the second transmission occasion based at least in part on the downlink control message;
counting the first transmission occasion and the second transmission occasion separately for a data rate calculation associated with the plurality of component carriers; and
decoding the transport block based at least in part on the monitoring, the data rate calculation, a number of transmission occasions of the plurality of transmission occasions associated with the downlink shared channel in the first component carrier, and a data rate limit across the plurality of component carriers including the first component carrier.

23. The method of claim 22, wherein the data rate limit is based at least in part on a data rate capability of the UE, a number of information bits of the transport block, and the number of transmission occasions of the plurality of transmission occasions associated with the downlink shared channel in the first component carrier.

24. The method of claim 22, wherein decoding the transport block comprises:
  determining a second data rate limit associated with the downlink shared channel for the first component carrier based at least in part on a first number of symbols for the first transmission occasion.

25. The method of claim 24, further comprising:
  transmitting, to the network device, a UE capability message indicating a data rate capability of the UE for the first component carrier, wherein the data rate limit is based at least in part on the data rate capability of the UE.

26. A method for wireless communications at a network device, comprising:
  receiving, from a user equipment (UE), a UE capability message indicating a data rate capability of the UE for a plurality of component carriers including a first component carrier; and
  transmitting, to the UE, a downlink control message that schedules a first repetition and a second repetition of a transport block for a downlink shared channel in the first component carrier of the plurality of component carriers based at least in part on the data rate capability of the UE, wherein the first repetition is scheduled in a first transmission occasion of a plurality of transmission occasions associated with the downlink shared channel and the second repetition is scheduled in a second transmission occasion of the plurality of transmission occasions associated with the downlink shared channel, and wherein the first transmission occasion and the second transmission occasion are included in a time slot.

27. The method of claim 26, further comprising:
  transmitting, to the UE, a message indicating a transmission configuration indicator state for transmission of the first repetition and the second repetition of the transport block for the downlink shared channel.

28. The method of claim 26, wherein transmitting the downlink control message comprises:
  transmitting the downlink control message indicating the first transmission occasion and the second transmission occasion for the transport block, wherein the first transmission occasion and the second transmission occasion are non-overlapping in time.

* * * * *